(12) United States Patent
Mu

(10) Patent No.: US 11,678,342 B2
(45) Date of Patent: Jun. 13, 2023

(54) METHODS AND APPARATUSES FOR TRANSMITTING INFORMATION AND RECEIVING INFORMATION, BASE STATION AND USER EQUIPMENT

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 206 days.

(21) Appl. No.: 17/256,329

(22) PCT Filed: Jun. 29, 2018

(86) PCT No.: PCT/CN2018/093853
§ 371 (c)(1),
(2) Date: Dec. 28, 2020

(87) PCT Pub. No.: WO2020/000446
PCT Pub. Date: Jan. 2, 2020

(65) Prior Publication Data
US 2021/0266879 A1 Aug. 26, 2021

(51) Int. Cl.
*H04W 72/04* (2023.01)
*H04W 72/23* (2023.01)
*H04W 72/1273* (2023.01)

(52) U.S. Cl.
CPC ....... *H04W 72/23* (2023.01); *H04W 72/1273* (2013.01)

(58) Field of Classification Search
CPC ......... H04W 72/0406; H04W 72/1273; H04W 72/042; H04L 5/0044; H04L 5/0053; H04L 5/0007; H04L 5/0055
See application file for complete search history.

(56) References Cited

U.S. PATENT DOCUMENTS

2014/0185537 A1* 7/2014 Papasakellariou .......................... H04W 72/0453
370/329
2014/0211747 A1* 7/2014 Takeda .................. H04L 1/1861
370/329
(Continued)

FOREIGN PATENT DOCUMENTS

CN 102082642 A 6/2011
CN 102123016 A 7/2011
(Continued)

OTHER PUBLICATIONS

State Intellectual Property Office of the People's Republic of China, Office Action and Search Report Issued in Application No. 2018800009498, dated Apr. 27, 2021, 20 pages.
(Continued)

*Primary Examiner* — Chi Ho A Lee
(74) *Attorney, Agent, or Firm* — Syncoda LLC; Feng Ma

(57) ABSTRACT

A method of transmitting information includes: determining one or more physical resource blocks (PRBs) for transmitting one or more associated channels of a current physical downlink control channel (PDCCH) and transmitting the one or more associated channels on the one or more determined PRBs. The one or more determined PRBs include one or more PRBs other than a current PRB for transmitting the current PDCCH. By determining one or more PRBs for transmitting the one or more associated channels of the current PDCCH or for repeatedly transmitting the current PDCCH, with the one or more determined PRBs including one or more PRBs other than the current PRB for transmitting the current PDCCH, when the one or more associated channels are transmitted on the one or more determined PRBs, it can avoid service congestion caused by excessive
(Continued)

load on a certain PRB, and can improve a scheduling flexibility.

18 Claims, 17 Drawing Sheets

(56) References Cited

U.S. PATENT DOCUMENTS

| | | | |
|---|---|---|---|
| 2015/0110015 A1 | 4/2015 | Dai et al. | |
| 2015/0358124 A1* | 12/2015 | Suzuki | H04L 5/0057 370/329 |
| 2016/0087774 A1 | 3/2016 | Guo et al. | |
| 2017/0164395 A1 | 6/2017 | Papasakellariou et al. | |
| 2018/0049169 A1* | 2/2018 | Lin | H04L 27/2602 |
| 2018/0110045 A1* | 4/2018 | You | H04W 72/042 |
| 2018/0376497 A1* | 12/2018 | You | H04L 5/0055 |
| 2019/0141679 A1* | 5/2019 | He | H04L 5/0053 |
| 2019/0261331 A1* | 8/2019 | Guthmann | H04L 5/0007 |
| 2020/0076559 A1* | 3/2020 | Yoshimura | H04W 72/0413 |
| 2021/0160035 A1* | 5/2021 | Kittichokechai | H04L 5/0053 |
| 2021/0368523 A1* | 11/2021 | Yoshioka | H04W 72/0453 |

FOREIGN PATENT DOCUMENTS

| | | |
|---|---|---|
| CN | 103199974 A | 7/2013 |
| CN | 104284435 A | 1/2015 |
| CN | 105991260 A | 10/2016 |

OTHER PUBLICATIONS

ISA State Intellectual Property Office of the People's Republic of China, Written Opinion of the International Searching Authority Issued in Application No. PCT/CN2018/093853, dated Mar. 19, 2019, WIPO, 9 pages.

ISA State Intellectual Property Office of the People's Republic of China, International Search Report Issued in Application No. PCT/CN2018/093853, dated Mar. 19, 2019, WIPO, 4 pages.

* cited by examiner

METHODS AND APPARATUSES FOR TRANSMITTING INFORMATION AND RECEIVING INFORMATION, BASE STATION AND USER EQUIPMENT

CROSS-REFERENCE TO RELATED APPLICATION

This application is a national stage of International Application No. PCT/CN2018/093853 filed on Jun. 29, 2018, the disclosure of which is hereby incorporated by reference in its entirety.

TECHNICAL FIELD

The present disclosure relates to the field of communication technology, and in particular, relates to methods and apparatuses for transmitting information, methods and apparatuses for receiving information, base stations, user equipment, and computer-readable storage media.

BACKGROUND

Narrowband Internet of Thing (NB-IoT), a highly promising Cellular Internet of Things technology, is widely used in such fields, as a smart city, e.g., meter reading, a smart agriculture, e.g., temperature, humidity and other information collection, a smart transportation, e.g., sharing bicycles, and the like.

Currently, a communication framework of the NB-IoT has been formed in Long Term Evolution (LTE), which has characteristics such as supporting low complexity or low cost, enhanced coverage, and saving power.

In order to achieve the NB-IoT characteristics of low complexity and low cost, a communication bandwidth for an NB-IoT terminal is only 180 k Hertz (Hz), corresponding to a physical resource of one physical resource block (PRB). In order to achieve the coverage enhancement, a repeated transmission mechanism is introduced in the NB-IoT, that is, same content is transmitted repeatedly in consecutive subframes to achieve an effect of power accumulation.

Similarly, as in the traditional LTE, a downlink scheduling in the NB-IoT consists of two parts. A base station first sends to a user equipment (UE) a narrowband physical downlink control channel (NB-PDCCH) that contains scheduling information on service information to be subsequently transmitted, such as a time-frequency position of the transmission, an encoding scheme of the transmission, etc. The service information to be subsequently transmitted is separately carried by a narrowband physical downlink shared channel (NB-PDSCH). For the current downlink scheduling, the NB-PDCCH and the NB-PDSCH have to be transmitted in the same PRB that is configured by a higher-layer signaling. However, as the number of users grows, a communication load concentrated on one PRB will gradually increase, which may result in service congestion. Also, the increased communication load will limit a scheduling flexibility, thereby leading to greater scheduling delay.

SUMMARY

In view of the above, the present disclosure discloses methods and apparatuses for transmitting information, methods and apparatuses for receiving information, a base station, a UE, and computer-readable storage media, so as to avoid service congestion due to an excessive load on a certain PRB, and improve a scheduling flexibility.

According to a first aspect of embodiments of the present disclosure, a method of transmitting information, being applicable to a base station, includes:

determining one or more PRBs for transmitting one or more associated channels of a current physical downlink control channel (PDCCH), where the one or more determined PRBs include one or more PRBs other than a current PRB for transmitting the current PDCCH; and transmitting the one or more associated channels on the one or more determined PRBs.

In an embodiment, determining one or more PRBs for transmitting the one or more associated channels of the current PDCCH includes:

determining a PRB set for transmitting a scheduled physical downlink shared channel (PDSCH) of the current PDCCH; and indicating, with downlink control information (DCI) of the current PDCCH, one or more PRBs for transmitting the scheduled PDSCH in the PRB set.

In an embodiment, determining one or more PRBs for transmitting the one or more associated channels of the current PDCCH includes:

determining a PRB set for transmitting a PDCCH that occurs after a preset time period from a time point corresponding to the current PDCCH and its scheduled PDSCH; and indicating, with DCI of the current PDCCH, one or more PRBs for transmitting the PDCCH that occurs after the preset time period from the time point corresponding to the current PDCCH and its scheduled PDSCH in the PRB set;

where transmitting the one or more associated channels on the one or more determined PRBs includes:

in response to receiving a hybrid automatic repeat request (HARQ) feedback for the scheduled PDSCH of the current PDCCH from a UE, transmitting the PDCCH that occurs after the preset time period from the time point corresponding to the current PDCCH and its scheduled PDSCH on the one or more indicated PRBs.

In an embodiment, determining one or more PRBs for transmitting the one or more associated channels of the current PDCCH includes:

determining one or more PRBs for repeatedly transmitting a PDCCH that occurs after a preset time period from a time point corresponding to the current PDCCH; or determining one or more PRBs for repeatedly transmitting the PDCCH that occurs after the preset time period from the time point corresponding to the current PDCCH and its scheduled PCSCH.

In an embodiment, indicating, with the DCI of the current PDCCH, one or more PRBs for transmitting the scheduled PDSCH in the PRB set includes:

indicating, with an information bit-indicated status in the DCI, a PRB for transmitting the scheduled PDSCH, where different information bit-indicated statuses correspond respectively to different PRBs in the PRB set; or indicating, with a radio network temporary identity (RNTI) value with which cyclic redundancy check (CRC) of the DCI is scrambled, a PRB for transmitting the scheduled PDSCH, where different RNTI values correspond respectively to different PRBs in the PRB set.

In an embodiment, indicating, with the DCI of the current PDCCH, one or more PRBs for transmitting the PDCCH that occurs after the preset time period from the time point corresponding to the current PDCCH and its scheduled PDSCH in the PRB set, includes:

indicating, with an information bit-indicated status in the DCI, a PRB for transmitting the PDCCH that occurs after the preset time period from the time point corresponding to the current PDCCH and its scheduled PDSCH; or indicating, with an RNTI value with which CRC of the DCI is scrambled, a PRB for transmitting the PDCCH that occurs after the preset time period from the time point corresponding to the current PDCCH and its scheduled PDSCH, where different RNTI values correspond respectively to different PRBs in the PRB set.

In an embodiment, determining one or more PRBs for repeatedly transmitting the PDCCH that occurs after the preset time period from the time point corresponding to the current PDCCH or determining one or more PRBs for repeatedly transmitting the PDCCH that occurs after the preset time period from the time point corresponding to the current PDCCH and its scheduled PCSCH, includes:

determining one or more PRBs for repeatedly transmitting the one or more associated channels based on generated first configuration information; where the first configuration information includes either a distance between each PRB to be determined and the current PRB or an index of each PRB to be determined, and includes a number of times each associated channel is repeatedly transmitted on each PRB; and where the one or more associated channels include the PDCCH that occurs after the preset time period from the time point corresponding to the current PDCCH and its scheduled PDSCH, or include the PDCCH that occurs after the preset time period from the time point corresponding to the current PDCCH.

In an embodiment, determining the PRB set for transmitting the scheduled PDSCH of the current PDCCH includes:

determining the PRB set based on generated second configuration information; or determining the PRB set based on a preset rule.

In an embodiment, determining the PRB set for transmitting the PDCCH that occurs after the preset time period from the time point corresponding to the current PDCCH and its scheduled PDSCH, includes:

determining the PRB set based on generated third configuration information; or determining the PRB set based on a preset rule.

In an embodiment, the method further includes:

sending the first configuration information to a UE through a scheduled PDSCH of the current PDCCH, to enable the UE to determine at least two PRBs for repeatedly transmitting the one or more associated channels and obtain the number of times each associated channel is repeatedly transmitted on each PRB.

In an embodiment, the method further includes:

in response to determining the PRB set based on the generated second configuration information, sending the second configuration information to a UE through a high-layer signaling.

In an embodiment, the method further includes:

in response to determining the PRB set based on the generated third configuration information, sending the third configuration information to the UE through a high-layer signaling.

According to a second aspect of embodiments of the present disclosure, a method of receiving information, being applicable to a UE, includes:

receiving a current PDCCH on a current PRB;

parsing DCI of the current PDCCH; and in response to determining, based on a parsing result, that one or more associated channels of the current PDCCH are transmitted by a base station on one or more other PRBs, receiving the one or more associated channels correspondingly on the one or more other PRBs.

In an embodiment, in response to determining, based on the parsing result, that the one or more associated channels of the current PDCCH are transmitted by the base station on the one or more other PRBs, receiving the one or more associated channels correspondingly on the one or more other PRBs includes:

in response to acquiring, based on the parsing result, that the one or more other PRBs are for transmitting a scheduled PDSCH of the current PDCCH, receiving the scheduled PDSCH of the current PDCCH on the one or more other PRBs.

In an embodiment, in response to determining, based on the parsing result, that the one or more associated channels of the current PDCCH are transmitted by the base station on the one or more other PRBs, receiving the one or more associated channels correspondingly on the one or more other PRBs includes:

in response to acquiring, based on the parsing result, that the current PRB is for transmitting a scheduled PDSCH of the current PDCCH and the one or more other PRBs are for transmitting a PDCCH that occurs after a preset time period from a time point corresponding to the current PDCCH and its scheduled PDSCH, receiving the scheduled PDSCH of the current PDCCH on the current PRB; and in response to providing an HARQ feedback for the scheduled PDSCH, receiving the PDCCH that occurs after the preset time period from the time point corresponding to the current PDCCH and its scheduled PDSCH on the one or more other PRBs.

In an embodiment, in response to determining, based on the parsing result, that the one or more associated channels of the current PDCCH are transmitted by the base station on the one or more other PRBs, receiving the one or more associated channels correspondingly on the one or more other PRBs includes:

in response to acquiring, based on the parsing result, that at least two PRBs are for repeatedly transmitting a PDCCH that occurs after a preset time period from a time point corresponding to the current PDCCH, receiving, in accordance with an obtained number of times each associated channel is repeatedly transmitted on each PRB, one or more repetitions of the PDCCH that occurs after the preset time period from the time point corresponding to the current PDCCH on each of the acquired PRBs.

In an embodiment, the method further includes:

combining and demodulating all received information of the PDCCH;

in response to acquiring, based on a demodulating result, that at least two PRBs are for repeatedly transmitting a scheduled PDSCH of the PDCCH that occurs after the preset time period from the time point corresponding to the current PDCCH, receiving, in accordance with the obtained number of times each associated channel is repeatedly transmitted on each PRB, one or more repetitions of the scheduled PDSCH on each of the currently acquired PRBs; and combining and demodulating all received information of the PDSCH.

In an embodiment, acquiring, based on the parsing result, that the one or more other PRBs are for transmitting the scheduled PDSCH of the current PDCCH includes:

determining, based on received second configuration information or a preset rule, a PRB set for transmitting the scheduled PDSCH of the current PDCCH; and acquiring, based on the determined PRB set and the parsing result, that the one or more other PRBs are for transmitting the scheduled PDSCH of the current PDCCH, where the parsing result includes one or more information bit-indicated statuses of the DCI or one or more RNTI values with which CRC of the DCI is scrambled.

In an embodiment, acquiring, based on the parsing result, that the current PRB is for transmitting the scheduled PDSCH of the current PDCCH and the one or more other PRBs are for transmitting the PDCCH that occurs after the preset time period from the time point corresponding to the current PDCCH and its scheduled PDSCH, includes:

determining, based on received third configuration information or a preset rule, a PRB set for transmitting the PDCCH that occurs after the preset time period from the time point corresponding to the current PDCCH and its scheduled PDSCH; and acquiring, based on the determined PRB set and the parsing result, that the one or more other PRBs are for transmitting the PDCCH that occurs after the preset time period from the time point corresponding to the current PDCCH and its scheduled PDSCH, where the parsing result includes one or more information bit-indicated statuses of the DCI or one or more RNTI values with which CRC of the DCI is scrambled.

In an embodiment, acquiring, based on the parsing result, that the at least two PRBs are for repeatedly transmitting the PDCCH that occurs after the preset time period from the time point corresponding to the current PDCCH, includes:

acquiring a scheduled PDSCH of the current PDCCH based on the parsing result;

acquiring first configuration information from the scheduled PDSCH; and acquiring, based on the first configuration information, that the at least two PRBs are for transmitting the PDCCH that occurs after the preset time period from the time point corresponding to the current PDCCH.

According to a third aspect of embodiments of the present disclosure, an apparatus for transmitting information, being applicable to a base station, includes:

a determining module, configured to determine one or more PRBs for transmitting one or more associated channels of a current PDCCH, where the one or more determined PRBs include one or more PRBs other than a current PRB for transmitting the current PDCCH; and a transmitting module, configured to transmit the one or more associated channels on the one or more PRBs determined by the determining module.

In an embodiment, the determining module includes:

a first determining submodule, configured to determine a PRB set for transmitting a scheduled PDSCH of the current PDCCH; and a first indicating submodule, configured to indicate, with DCI of the current PDCCH, one or more PRBs for transmitting the scheduled PDSCH in the PRB set determined by the first determining submodule.

In an embodiment, the determining module includes:

a second determining submodule, configured to determine a PRB set for transmitting a PDCCH that occurs after a preset time period from a time point corresponding to the current PDCCH and its scheduled PDSCH; and a second indicating submodule, configured to indicate, with DCI of the current PDCCH, one or more PRBs for transmitting the PDCCH that occurs after the preset time period from the time point corresponding to the current PDCCH and its scheduled PDSCH in the PRB set determined by the second determining submodule;

where the transmitting module is configured to in response to that an HARQ feedback for the scheduled PDSCH of the current PDCCH is received from a UE, transmit the PDCCH that occurs after the preset time period from the time point corresponding to the current PDCCH and its scheduled PDSCH on the one or more PRBs indicated by the second indicating submodule.

In an embodiment, the determining module includes:

a third determining submodule, configured to determine one or more PRBs for repeatedly transmitting a PDCCH that occurs after a preset time period from a time point corresponding to the current PDCCH; or a fourth determining submodule, configured to determine one or more PRBs for repeatedly transmitting the PDCCH that occurs after the preset time period from the time point corresponding to the current PDCCH and its scheduled PCSCH.

In an embodiment, the first determining submodule includes:

a first indicating unit, configured to indicate, with an information bit-indicated status in the DCI, a PRB for transmitting the scheduled PDSCH, where different information bit-indicated statuses correspond respectively to different PRBs in the PRB set; or a second indicating unit, configured to indicate, with an RNTI value with which CRC of the DCI is scrambled, a PRB for transmitting the scheduled PDSCH, where different RNTI values correspond respectively to different PRBs in the PRB set.

In an embodiment, the second indicating submodule includes:

a third indicating unit, configured to indicate, with an information bit-indicated status in the DCI, a PRB for transmitting the PDCCH that occurs after the preset time period from the time point corresponding to the current PDCCH and its scheduled PDSCH, where different information bit-indicated statuses correspond respectively to different PRBs in the PRB set; or a fourth indicating unit, configured to indicate, with an RNTI value with which CRC of the DCI is scrambled, a PRB for transmitting the PDCCH that occurs after the preset time period from the time point corresponding to the current PDCCH and its scheduled PDSCH, where different RNTI values correspond respectively to different PRBs in the PRB set.

In an embodiment, the third determining submodule or the fourth determining submodule includes:

a determining unit, configured to determine one or more PRBs for repeatedly transmitting the one or more associated channels based on generated first configuration information; where the first configuration information includes either a distance between each PRB to be determined and the current PRB or an index of each PRB to be determined, and includes a number of times each associated channel is repeatedly transmitted on each PRB; and where the one or more associated channels include the PDCCH that occurs after the preset time period from the time point corresponding to the current PDCCH and its scheduled PDSCH, or include the PDCCH that occurs after the preset time period from the time point corresponding to the current PDCCH.

In an embodiment, the first determining submodule includes:

a first determining unit, configured to determine the PRB set based on generated second configuration information; or a second determining unit, configured to determine the PRB set based on a preset rule.

In an embodiment, the second determining submodule includes:

a third determining unit, configured to determine the PRB set based on generated third configuration information; or a fourth determining unit, configured to determine the PRB set based on a preset rule.

In an embodiment, the apparatus further includes:

a first sending module, configured to send the first configuration information to a UE through a scheduled PDSCH of the current PDCCH, to enable the UE to determine at least two PRBs for repeatedly transmitting the one or more associated channels and obtain the number of times each associated channel is repeatedly transmitted on each PRB.

In an embodiment, the apparatus further includes:

a second sending module, configured to in response to that the PRB set is determined by the first determining unit based on the generated second configuration information, send the second configuration information to a UE through a high-layer signaling.

In an embodiment, the apparatus further includes:

a third sending module, configured to in response to that the PRB set is determined by the third determining unit based on the generated third configuration information, send the third configuration information to the UE through a high-layer signaling.

According to a fourth aspect of embodiments of the present disclosure, an apparatus for receiving information, being applicable to a UE, includes:

a receiving module, configured to receive a current PDCCH on a current PRB;

a parsing module, configured to parse DCI of the current PDCCH received by the receiving module; and a determining and receiving module, configured to in response to determining, based on a parsing result from the parsing module, that one or more associated channels of the current PDCCH are transmitted by a base station on one or more other PRBs, receive the one or more associated channels correspondingly on the one or more other PRBs.

In an embodiment, the determining and receiving module includes:

a first acquiring and receiving submodule, configured to in response to acquiring, based on the parsing result, that the one or more other PRBs are for transmitting a scheduled PDSCH of the current PDCCH, receive the scheduled PDSCH of the current PDCCH on the one or more other PRBs.

In an embodiment, the determining and receiving module includes:

a second acquiring and receiving submodule, configured to in response to acquiring, based on the parsing result, that the current PRB is for transmitting a scheduled PDSCH of the current PDCCH and the one or more other PRBs are for transmitting a PDCCH that occurs after a preset time period from a time point corresponding to the current PDCCH and its scheduled PDSCH, receive the scheduled PDSCH of the current PDCCH on the current PRB; and a third receiving submodule, configured to after an HARQ feedback is provided for the scheduled PDSCH received by the second acquiring and receiving submodule, receive the PDCCH that occurs after the preset time period from the time point corresponding to the current PDCCH and its scheduled PDSCH on the one or more other PRBs.

In an embodiment, the determining and receiving module includes:

a fourth acquiring and receiving submodule, configured to in response to acquiring, based on the parsing result, that at least two PRBs are for repeatedly transmitting a PDCCH that occurs after a preset time period from a time point corresponding to the current PDCCH, receive, in accordance with an obtained number of times each associated channel is repeatedly transmitted on each PRB, one or more repetitions of the PDCCH that occurs after the preset time period from the time point corresponding to the current PDCCH on each of the acquired PRBs.

In an embodiment, the apparatus further includes:

a first demodulating module, configured to combine and demodulate all information of the PDCCH received by the fourth acquiring and receiving submodule;

an acquiring and receiving module, configured to in response to acquiring, based on a demodulating result from the first demodulating module, that at least two PRBs are for repeatedly transmitting a scheduled PDSCH of the PDCCH that occurs after the preset time period from the time point corresponding to the current PDCCH, receive, in accordance with the obtained number of times each associated channel is repeatedly transmitted on each PRB, one or more repetitions of the scheduled PDSCH on each of the currently acquired PRBs; and a second demodulating module, configured to combine and demodulate all information of the PDSCH received by the acquiring and receiving module.

In an embodiment, the first acquiring and receiving submodule includes:

a first determining unit, configured to determine, based on received second configuration information or a preset rule, a PRB set for transmitting the scheduled PDSCH of the current PDCCH; and a first acquiring unit, configured to acquire, based on the parsing result and the PRB set determined by the first determining unit, that the one or more other PRBs are for transmitting the scheduled PDSCH of the current PDCCH, where the parsing result includes one or more information bit-indicated statuses of the DCI or one or more RNTI values with which CRC of the DCI is scrambled.

In an embodiment, the second acquiring and receiving submodule includes:

a second determining unit, configured to determine, based on received third configuration information or a preset rule, a PRB set for transmitting the PDCCH that occurs after the preset time period from the time point corresponding to the current PDCCH and its scheduled PDSCH; and a second acquiring unit, configured to acquire, based on the parsing result and the PRB set determined by the second determining unit, that the one or more other PRBs are for transmitting the PDCCH that occurs after the preset time period from the time point corresponding to the current PDCCH and its scheduled PDSCH, where the parsing result includes one or more information bit-indicated statuses of the DCI or one or more RNTI values with which CRC of the DCI is scrambled.

In an embodiment, the fourth acquiring and receiving submodule includes:

a third acquiring unit, configured to acquire a scheduled PDSCH of the current PDCCH based on the parsing result;

a fourth acquiring unit, configured to acquire first configuration information from the scheduled PDSCH acquired by the third acquiring unit; and a fifth acquiring unit, configured to acquire, based on the first configuration information acquired by the fourth acquiring unit, that the at least two PRBs are for transmitting the PDCCH that occurs after the preset time period from the time point corresponding to the current PDCCH.

According to a fifth aspect of embodiments of the present disclosure, a base station includes:

a processor; and a memory for storing instructions executable by the processor;

where the processor is configured to:

determine one or more PRBs for transmitting one or more associated channels of a current PDCCH, where the one or more determined PRBs include one or more PRBs other than a current PRB for transmitting the current PDCCH; and transmit the one or more associated channels on the one or more determined PRBs.

According to a sixth aspect of embodiments of the present disclosure, user equipment includes:

a processor; and a memory for storing instructions executable by the processor;

where the processor is configured to:

receive a current PDCCH on a current PRB;

parse DCI of the current PDCCH; and in response to determining, based on a parsing result, that one or more associated channels of the current PDCCH are transmitted by a base station on one or more other PRBs, receive the one or more associated channels correspondingly on the one or more other PRBs.

According to a seventh aspect of embodiments of the present disclosure, there is provided a computer-readable storage medium having computer instructions stored thereon, where when the instructions are executed by a processor, the steps of the method of transmitting information described above are performed.

According to an eighth aspect of embodiments of the present disclosure, there is provided a computer-readable storage medium having computer instructions stored thereon, where when the instructions are executed by a processor, the steps of the method of receiving information described above are performed.

The technical solutions provided according to embodiments of the present disclosure may obtain the following beneficial effects.

By determining one or more PRBs for transmitting one or more associated channels of a current PDCCH or for repeatedly transmitting the current PDCCH, with the one or more determined PRBs including one or more PRBs other than a current PRB for transmitting the current PDCCH, when the one or more associated channels are transmitted on the one or more determined PRBs, it can avoid service congestion caused by excessive load on a certain PRB, and can improve a scheduling flexibility.

By receiving a current PDCCH on a current PRB, parsing DCI of the current PDCCH, and when determining based on a parsing result that one or more associated channels of the current PDCCH are transmitted by a base station on one or more other PRBs, receiving the one or more associated channels correspondingly on the one or more other PRBs, it can avoid service congestion caused by excessive load on a certain PRB.

It should be understood that the above general description and the following detailed description are only exemplary and explanatory, and are not intended to limit the present disclosure.

BRIEF DESCRIPTION OF THE DRAWINGS

The accompanying drawings, which are incorporated in and constitute a part of this disclosure, illustrate examples consistent with the present disclosure and, together with the description, serve to explain the principles of the disclosure.

DETAILED DESCRIPTION

Figure 1:
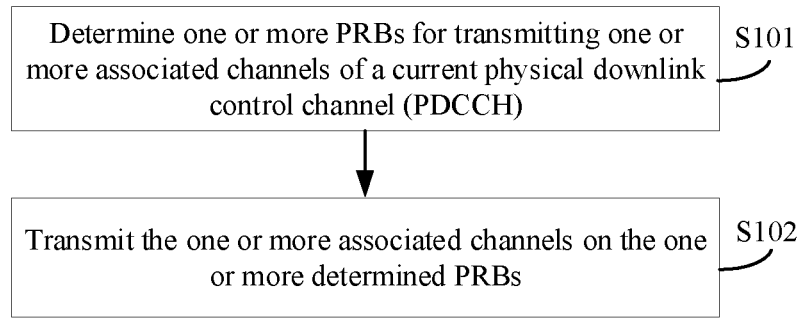
FIG. 1 is a flowchart illustrating a method of transmitting information according to an example of the present disclosure.

Exemplary embodiments will be described in detail here with the examples thereof expressed in the drawings. Where the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

FIG. 1 is a flowchart illustrating a method of transmitting information according to an example of the present disclosure. This example is described from a base station side. As shown in FIG. 1, the method of transmitting information includes the following steps.

At step S101, one or more PRBs for transmitting one or more associated channels of a current PDCCH are determined. The one or more determined PRBs include one or more PRBs other than a current PRB for transmitting the current PDCCH.

In one or more embodiments, the one or more associated channels of the current PDCCH may include but are not limited to a scheduled PDSCH of the current PDCCH, may include a PDCCH that occurs after a preset time period from a time point corresponding to the current PDCCH and its scheduled PDSCH, and may include the PDCCH that occurs after the preset time period from the time point corresponding to the current PDCCH.

In the above embodiments, determining one or more PRBs for transmitting the one or more associated channels of the current PDCCH may include but is not limited to any one of the followings:

determining one or more PRBs for transmitting the scheduled PDSCH of the current PDCCH;

determining one or more PRBs for transmitting the PDCCH and its scheduled PDSCH, where the PDCCH occurs after the preset time period from the time point corresponding to the current PDCCH;

determining one or more PRBs for repeatedly transmitting the PDCCH that occurs after the preset time period from the time point corresponding to the current PDCCH; and determining one or more PRBs for repeatedly transmitting the PDCCH and its scheduled PDSCH, where the PDCCH occurs after the preset time period from the time point corresponding to the current PDCCH.

At step S102, the one or more associated channels are transmitted on the one or more determined PRBs.

In this example, after one or more PRBs are determined for the one or more associated channels, the one or more corresponding associated channels are transmitted on the one or more determined PRBs.

According to the above example, by determining one or more PRBs for transmitting the one or more associated channels of the current PDCCH or for repeatedly transmitting the current PDCCH, with the one or more determined PRBs including one or more PRBs other than a current PRB for transmitting the current PDCCH, when the one or more associated channels are transmitted on the one or more determined PRBs, it can avoid service congestion caused by excessive load on a certain PRB, and can improve a scheduling flexibility.

Figure 2:
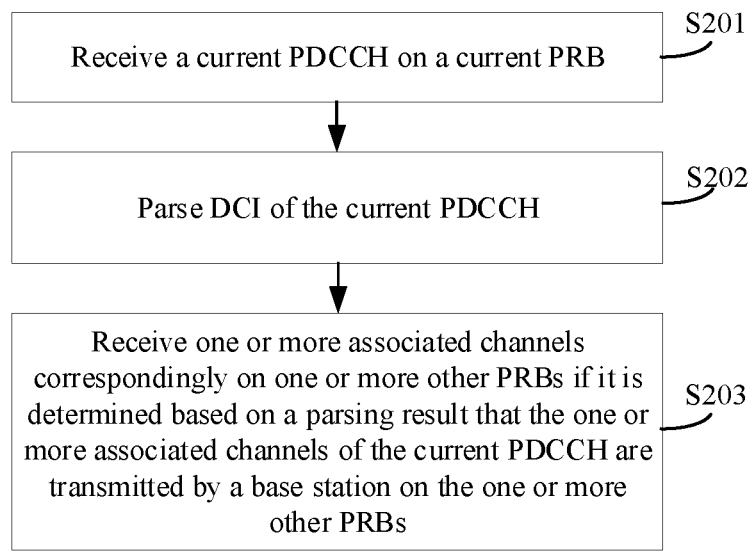
FIG. 2 is a flowchart illustrating a method of receiving information according to an example of the present disclosure.

FIG. 2 is a flowchart illustrating a method of receiving information according to an example of the present disclosure. This example is described from a UE side. As shown in FIG. 2, the method of receiving information includes the following steps.

At step S201, a current PDCCH is received on a current PRB.

At step S202, DCI of the current PDCCH is parsed.

At step S203, if it is determined based on a parsing result that one or more associated channels of the current PDCCH are transmitted by a base station on one or more other PRBs, the one or more associated channels are received correspondingly on the one or more other PRBs.

In one or more embodiments, the one or more associated channels of the current PDCCH may include but are not limited to a scheduled PDSCH of the current PDCCH, may include a PDCCH that occurs after a preset time period from a time point corresponding to the current PDCCH and its scheduled PDSCH, and may include the PDCCH that occurs after the preset time period from the time point corresponding to the current PDCCH.

In this example, if it is determined based on the parsing result that the one or more associated channels of the current PDCCH are transmitted by the base station on the one or more other PRBs, the one or more associated channels may be received correspondingly on the one or more other PRBs.

According to the above example, by receiving the current PDCCH on the current PRB, parsing the DCI of the current PDCCH, and when it is determined based on the parsing result that the one or more associated channels of the current PDCCH are transmitted by the base station on the one or more other PRBs, receiving the one or more associated channels correspondingly on the one or more other PRBs, it can avoid service congestion caused by excessive load on a certain PRB.

Example One

Figure 3:
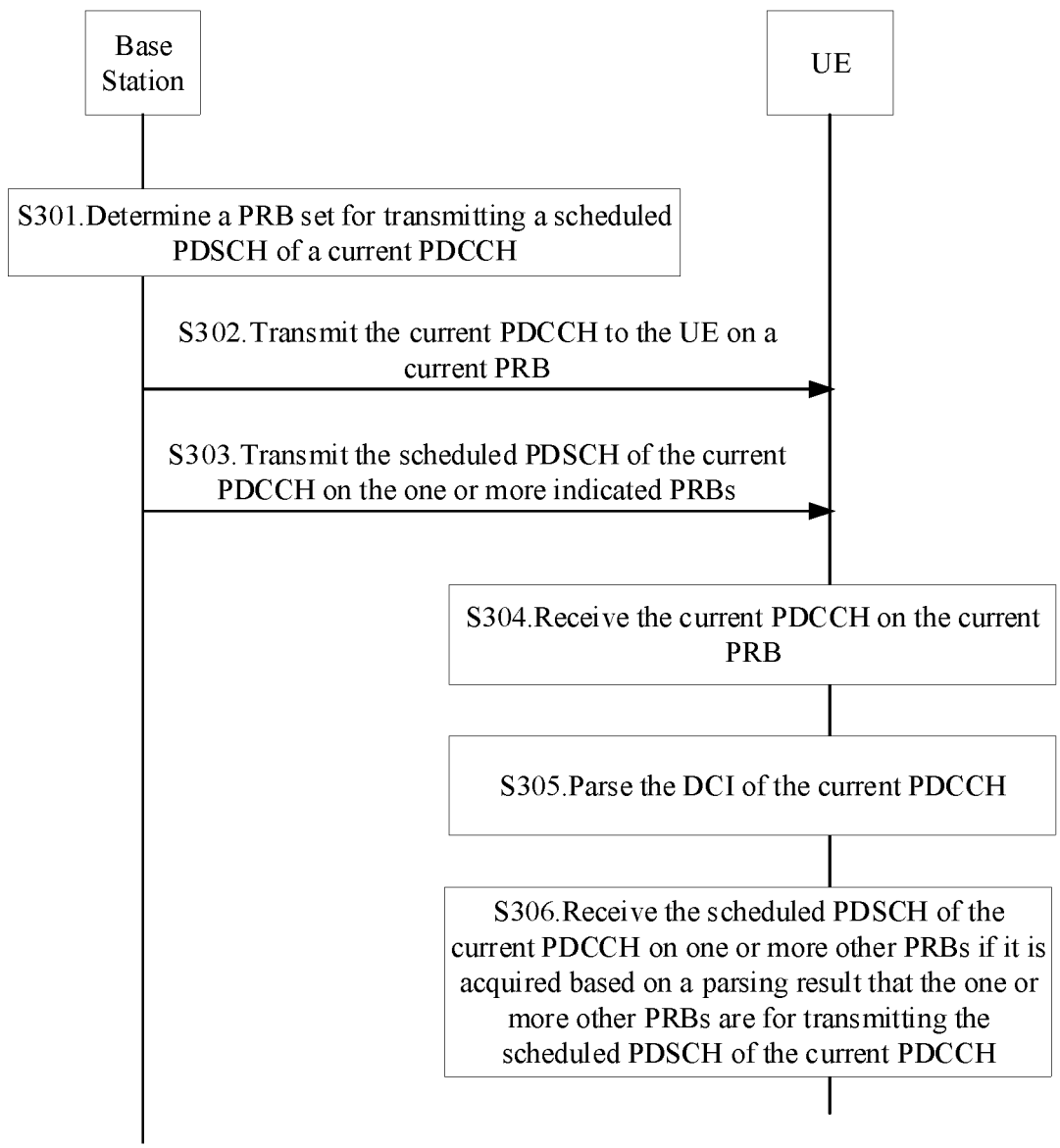
FIG. 3 is a signaling flowchart illustrating a method of transmitting and receiving information according to an example of the present disclosure.

FIG. 3 is a signaling flowchart illustrating a method of transmitting and receiving information according to an example of the present disclosure. As shown in FIG. 3, the method includes the following steps.

At step S301, a base station determines a PRB set for transmitting a scheduled PDSCH of a current PDCCH.

In one or more embodiments, the PRB set for transmitting the scheduled PDSCH of the current PDCCH may be determined based on generated second configuration information, or the PRB set may be determined based on a preset rule.

In addition, in one or more embodiments, after the PRB set is determined based on the generated second configuration information, the second configuration information may be sent to a UE through a high-layer signaling.

At step S302, the base station transmits the current PDCCH to the UE on a current PRB, and indicates with DCI of the current PDCCH one or more PRBs for transmitting the scheduled PDSCH in the PRB set.

In one or more embodiments, one or more PRBs for transmitting the scheduled PDSCH in the PRB set may be indicated in the following ways.

Way 11. A PRB for transmitting the scheduled PDSCH is indicated with an information bit-indicated status in the DCI, where different information bit-indicated statuses correspond respectively to different PRBs in the PRB set.

For example, a corresponding relationship between the information bit-indicated statuses and the PRBs established by the base station may be as shown in Table 1.

TABLE 1

A corresponding relationship between information bit-indicated statuses and PRBs

| Information bit-indicated status | PRB identifier |
|---|---|
| 00 | PRB_1 |
| 01 | PRB_2 |
| 10 | PRB_3 |
| 11 | PRB_4 |

Way 12. A PRB for transmitting the scheduled PDSCH is indicated with an RNTI value with which CRC of the DCI is scrambled, where different RNTI values correspond respectively to different PRBs in the PRB set.

For example, a corresponding relationship between the RNTI values and the PRBs established by the base station may be as shown in Table 2.

TABLE 2

A corresponding relationship between RNTI values and PRBs

| RNTI value | PRB identifier |
| --- | --- |
| RNTI1 | PRB_1 |
| RNTI2 | PRB_2 |
| RNTI3 | PRB_3 |
| RNTI4 | PRB_4 |

At step S303, the base station transmits the scheduled PDSCH of the current PDCCH on the one or more indicated PRBs.

At step S304, the UE receives the current PDCCH on the current PRB.

At step S305, the UE parses the DCI of the current PDCCH.

At step S306, if the UE acquires based on a parsing result that one or more other PRBs are for transmitting the scheduled PDSCH of the current PDCCH, the UE receives the scheduled PDSCH of the current PDCCH on the one or more other PRBs.

In one embodiment, for example, if PDCCH1 is the current PDCCH and PRB1 is the current PRB, the UE may receive the PDCCH1 on the PRB1 and parse the PDCCH1 to obtain the parsing result. The parsing result may include one or more information bit-indicated statuses of the DCI or one or more RNTI values with which the CRC of the DCI is scrambled.

In this embodiment, the UE may determine a PRB set for transmitting the scheduled PDSCH1 of the PDCCH1 based on the received second configuration information or the preset rule, and acquire, based on the determined PRB set and the above parsing result, that one or more other PRBs, e.g., PRB2, are for transmitting the scheduled PDSCH1 of the PDCCH1. Then, the UE receives the PDSCH1 on the PRB2.

According to the above example, the interaction between the base station and the UE enables the UE to receive the one or more channels on different PRBs, thereby avoiding service congestion caused by excessive load on a certain PRB.

Example Two

Figure 4:
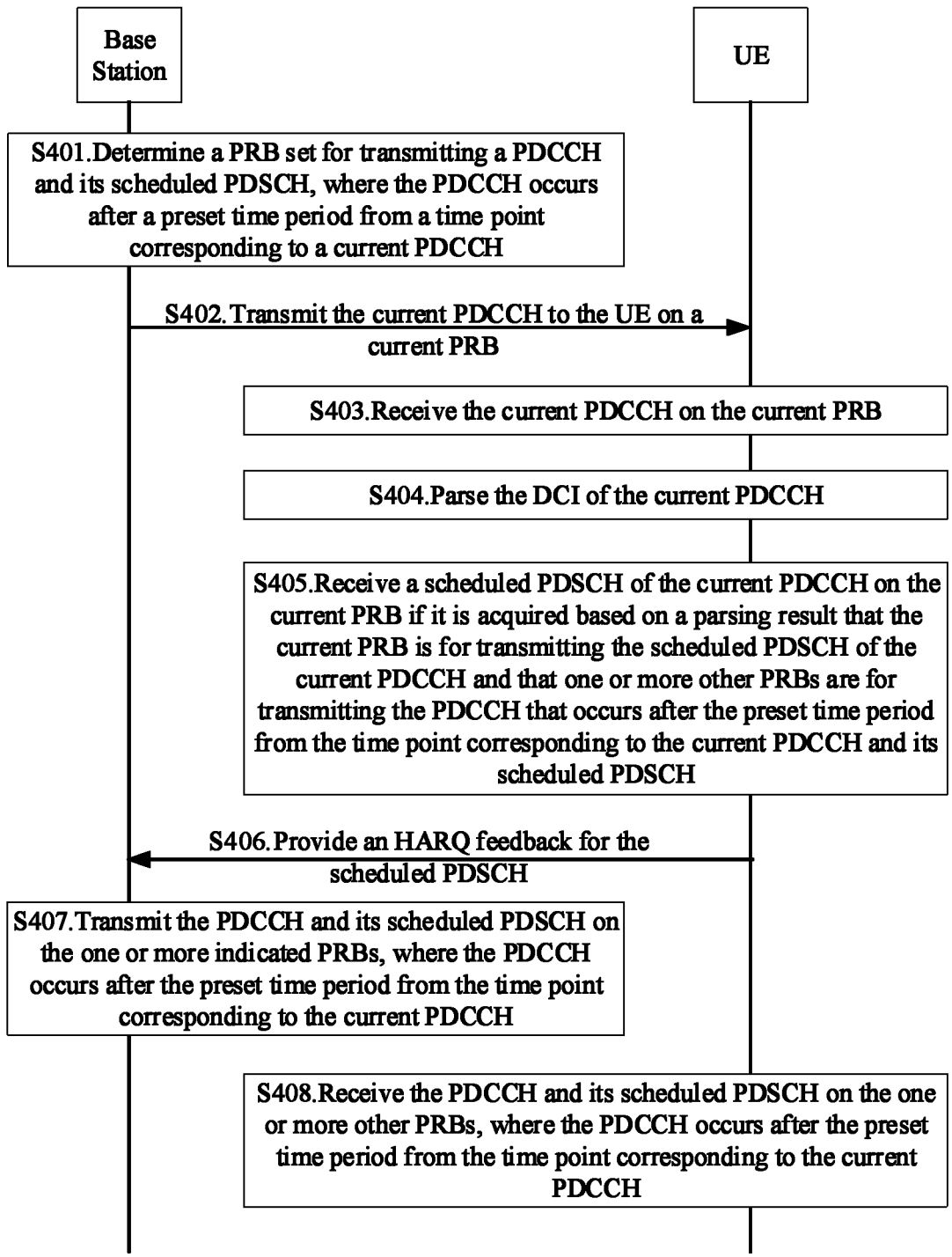
FIG. 4 is a signaling flowchart illustrating another method of transmitting and receiving information according to an example of the present disclosure.

FIG. 4 is a signaling flowchart illustrating another method of transmitting and receiving information according to an example of the present disclosure. As shown in FIG. 4, the method includes the following steps.

At step S401, a base station determines a PRB set for transmitting a PDCCH and its scheduled PDSCH, where the PDCCH occurs after a preset time period from a time point corresponding to a current PDCCH.

In one or more embodiments, the PRB set for transmitting the PDCCH and its scheduled PDSCH may be determined based on generated third configuration information, or the PRB set for transmitting the PDCCH and its scheduled PDSCH may be determined based on a preset rule; where the PDCCH occurs after the preset time period from the time point corresponding to the current PDCCH.

In addition, in one or more embodiments, after the PRB set is determined based on the generated third configuration information, the third configuration information may be sent to a UE through a high-layer signaling.

At step S402, the base station transmits the current PDCCH to the UE on a current PRB, and indicates with DCI of the current PDCCH one or more PRBs for transmitting the PDCCH and its scheduled PDSCH in the PRB set, where the PDCCH occurs after the preset time period from the time point corresponding to the current PDCCH.

In one or more embodiments, one or more PRBs for transmitting the PDCCH and its scheduled PDSCH in the PRB set may be indicated in the following ways, where the PDCCH occurs after the preset time period from the time point corresponding to the current PDCCH.

Way 21. A PRB for transmitting the PDCCH and its scheduled PDSCH is indicated with an information bit-indicated status in the DCI, where the PDCCH occurs after the preset time period from the time point corresponding to the current PDCCH and where different information bit-indicated statuses correspond respectively to different PRBs in the PRB set.

Way 22. A PRB for transmitting the PDCCH and its scheduled PDSCH is indicated with an RNTI value with which CRC of the DCI is scrambled, where the PDCCH occurs after the preset time period from the time point corresponding to the current PDCCH and where different RNTI values correspond respectively to different PRBs in the PRB set.

At step S403, the UE receives the current PDCCH on the current PRB.

At step S404, the UE parses the DCI of the current PDCCH.

At step S405, if the UE acquires based on a parsing result that the current PRB is for transmitting a scheduled PDSCH of the current PDCCH and that one or more other PRBs are for transmitting the PDCCH that occurs after the preset time period from the time point corresponding to the current PDCCH and its scheduled PDSCH, the UE receives the scheduled PDSCH of the current PDCCH on the current PRB.

In one or more embodiments, the UE may determine the PRB set for transmitting the PDCCH and its scheduled PDSCH based on the received third configuration information or the preset rule, and may acquire, based on the determined PRB set and the parsing result, that the one or more other PRBs are for transmitting the PDCCH and its scheduled PDSCH, where the PDCCH occurs after the preset time period from the time point corresponding to the current PDCCH. The parsing result may include one or more information bit-indicated statuses of the DCI or one or more RNTI values with which CRC of the DCI is scrambled.

Supposing that PDCCH1 is the current PDCCH, PDCCH2 is the PDCCH that occurs after the preset time period from the time point corresponding to the current PDCCH, (PRB1, PRB2, PRB3, PRB4) is the PRB set determined by the base station and for transmitting the PDCCH that occurs after the preset time period from the time point corresponding to the current PDCCH and its scheduled PDSCH, and it is indicated with the DCI of the PDCCH1 that the PRB2 in the PRB set is for transmitting the PDCCH2 and its scheduled PDSCH2. Accordingly, after the base station transmits the PDCCH1 to the UE on the PRB1 and the UE receives the PDCCH1, the UE may acquire based on a result of parsing the PDCCH1 that the PRB1 is for transmitting the scheduled PDSCH1 of the PDCCH1 and the PRB2 is for transmitting the PDCCH2 and its scheduled PDSCH2, and then receive the PDSCH1 on the PRB1.

At step S406, the UE provides an HARQ feedback for the scheduled PDSCH.

At step S407, after receiving the HARQ feedback for the scheduled PDSCH from the UE, the base station transmits the PDCCH and its scheduled PDSCH on the one or more indicated PRBs, where the PDCCH occurs after the preset time period from the time point corresponding to the current PDCCH.

The UE may provide the HARQ feedback for the received PDSCH1, and the base station may transmit the PDCCH2 and the PDSCH2 on the PRB2 after receiving the HARQ feedback.

At step S408, the UE receives the PDCCH and its scheduled PDSCH on the one or more other PRBs, where the PDCCH occurs after the preset time period from the time point corresponding to the current PDCCH.

According to the above example, the interaction between the base station and the UE enables the UE to receive the one or more channels on different PRBs, thereby avoiding service congestion caused by excessive load on a certain PRB.

Example Three

Figure 5:
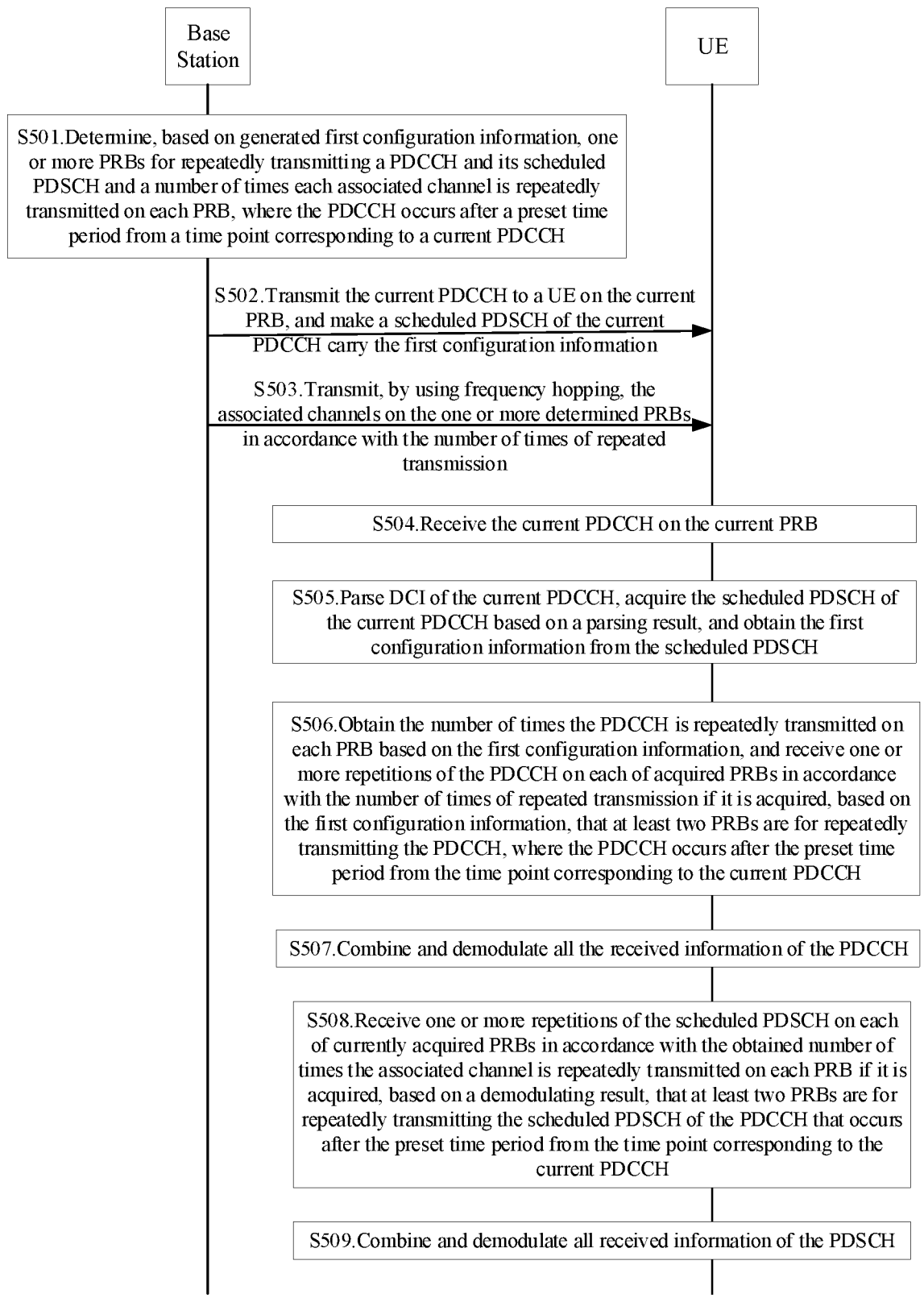
FIG. 5 is a signaling flowchart illustrating another method of transmitting and receiving information according to an example of the resent disclosure.

FIG. 5 is a signaling flowchart illustrating another method of transmitting and receiving information according to an example of the present disclosure. As shown in FIG. 5, the method includes the following steps.

At step S501, based on generated first configuration information, a base station determines one or more PRBs for repeatedly transmitting a PDCCH and its scheduled PDSCH and a number of times each associated channel is repeatedly transmitted on each PRB, where the PDCCH occurs after a preset time period from a time point corresponding to a current PDCCH.

In one or more embodiments, the base station may determine one or more PRBs for repeatedly transmitting the one or more associated channels based on the generated first configuration information. The first configuration information includes either a distance between each PRB to be determined and a current PRB or an index of each PRB to be determined, and includes a number of times each associated channel is repeatedly transmitted on each PRB. The one or more associated channels include the PDCCH and its scheduled PDSCH, or include the PDCCH, where the PDCCH occurs after the preset time period from the time point corresponding to the current PDCCH.

In one or more embodiments, the one or more PRBs for repeatedly transmitting the PDCCH and the one or more PRBs for repeatedly transmitting the scheduled PDSCH of the PDCCH may be identical or different, where the PDCCH occurs after the preset time period from the time point corresponding to the current PDCCH.

At step S502, the base station transmits the current PDCCH to a UE on the current PRB, and makes a scheduled PDSCH of the current PDCCH carry the first configuration information.

At step S503, the base station transmits, by using frequency hopping, the associated channels on the one or more determined PRBs in accordance with the number of times of repeated transmission, where the associated channels include the PDCCH and its scheduled PDSCH and where the PDCCH occurs after the preset time period from the time point corresponding to the current PDCCH.

Supposing that PDCCH1 is the current PDCCH, PRB1 is the current PRB, PDCCH2 is the PDCCH that occurs after the preset time period from the time point corresponding to the current PDCCH, PRB 2 and PRB3 are for repeatedly transmitting the PDCCH2, PRB 3 and PRB 4 are for repeatedly transmitting the scheduled PDSCH2 of the PDCCH2, the number of times the PDCCH2 as well as the scheduled PDSCH2 of the PDCCH2 is repeatedly transmitted on each PRB is 4, and a number of times the PDCCH2 as well as the scheduled PDSCH2 of the PDCCH2 is expected to be repeatedly transmitted is 8. Accordingly, the base station transmits the PDCCH1 on the PRB1, with the first configuration information carried through the PDSCH1, and then transmits repetition #1-repetition #4 of the PDCCH2 on the PRB2 and transmits repetition #5-repetition #8 of the PDCCH2 on the PRB3. Similarly, repetition #1-repetition #4 of the PDSCH2 are transmitted on the PRB3 and repetition #5-repetition #8 of the PDSCH2 are transmitted on the PRB4.

At step S504, the UE receives the current PDCCH on the current PRB.

At step S505, the UE parses DCI of the current PDCCH, acquires the scheduled PDSCH of the current PDCCH based on a parsing result, and obtains the first configuration information from the scheduled PDSCH.

At step S506, if the UE acquires, based on the first configuration information, that at least two PRBs are for repeatedly transmitting the PDCCH, the UE obtains the number of times the PDCCH is repeatedly transmitted on each PRB based on the first configuration information, and receives one or more repetitions of the PDCCH on each of the acquired PRBs in accordance with the number of times of repeated transmission, where the PDCCH occurs after the preset time period from the time point corresponding to the current PDCCH.

In one or more embodiments, if the UE acquires that the at least two PRBs, e.g., PRB2 and PRB3, are for repeatedly transmitting the PDCCH2, and the number of times each channel is repeatedly transmitted on each PRB is 4, the UE can receive 4 repetitions of the PDCCH2 on the PRB2 and 4 repetitions of the PDCCH2 on the PRB3.

At step S507, the UE combines and demodulates all the received information of the PDCCH.

The UE may combine and demodulate all the received information of the PDCCH to obtain one DCI.

At step S508, if the UE acquires, based on a demodulating result, that at least two PRBs are for repeatedly transmitting the scheduled PDSCH of the PDCCH that occurs after the preset time period from the time point corresponding to the current PDCCH, the UE receives one or more repetitions of the scheduled PDSCH on each of the currently acquired PRBs in accordance with the obtained number of times the associated channel is repeatedly transmitted on each PRB.

In one or more embodiments, if the UE acquires, based on the demodulating result, that the at least two PRBs, e.g., still PRB2 and PRB3, are for repeatedly transmitting the scheduled PDSCH2 of the PDCCH2, and the number of times each channel is repeatedly transmitted on each PRB is 4, the UE can receive 4 repetitions of the PDSCH2 on the PRB2 and 4 repetitions of the PDSCH2 on the PRB3.

At step S509, the UE combines and demodulates all received information of the PDSCH.

The UE may combine and demodulate all the received information of the PDSCH to obtain information on one transport block.

According to the above example, the interaction between the base station and the UE enables the UE to repeatedly transmit a certain channel on different PRBs, thereby avoiding service congestion caused by excessive load on a certain PRB.

Figure 6:
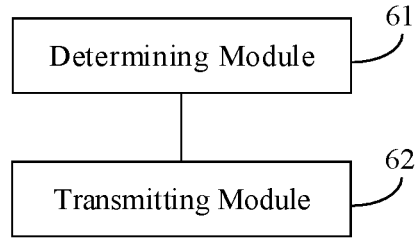
FIG. 6 is a block diagram illustrating an apparatus for transmitting information according to an example of the present disclosure.

FIG. 6 is a block diagram illustrating an apparatus for transmitting information according to an example. The apparatus may be located in a base station. As shown in FIG. 6, the apparatus includes a determining module 61 and a transmitting module 62.

The determining module 61 is configured to determine one or more PRBs for transmitting one or more associated channels of a current PDCCH, where the one or more determined PRBs include one or more PRBs other than a current PRB for transmitting the current PDCCH.

In one or more embodiments, the one or more associated channels of the current PDCCH may include but are not limited to a scheduled PDSCH of the current PDCCH, may include a PDCCH that occurs after a preset time period from a time point corresponding to the current PDCCH and its scheduled PDSCH, and may include the PDCCH that occurs after the preset time period from the time point corresponding to the current PDCCH.

The transmitting module 62 is configured to transmit the one or more associated channels on the one or more PRBs determined by the determining module 61.

In this example, after one or more PRBs are determined for the one or more associated channels, the one or more corresponding associated channels are transmitted on the one or more determined PRBs.

According to the above example, by determining one or more PRBs for transmitting the one or more associated channels of the current PDCCH or for repeatedly transmitting the current PDCCH, with the one or more determined PRBs including one or more PRBs other than a current PRB for transmitting the current PDCCH, when the one or more associated channels are transmitted on the one or more determined PRBs, it can avoid service congestion caused by excessive load on a certain PRB, and can improve a scheduling flexibility.

Figure 7:
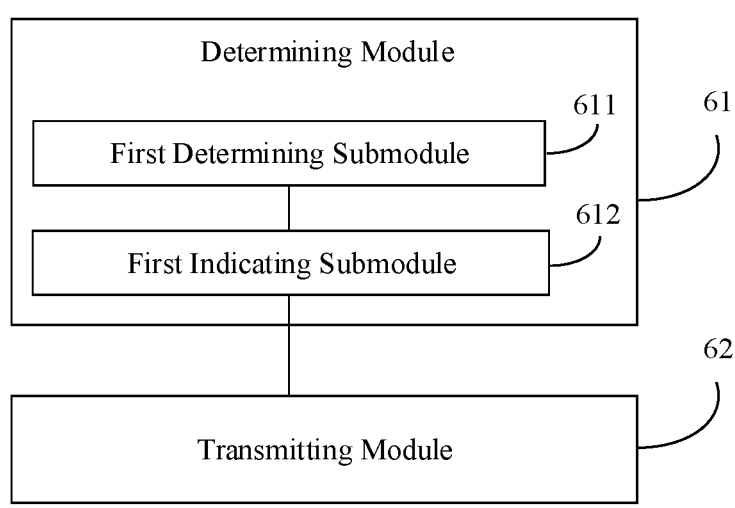
FIG. 7 is a block diagram of another apparatus for transmitting information according to an example.

FIG. 7 is a block diagram illustrating another apparatus for transmitting information according to an example. As shown in FIG. 7, on the basis of the example shown in FIG. 6, the determining module 61 may include a first determining submodule 611 and a first indicating submodule 612.

The first determining submodule 611 is configured to determine a PRB set for transmitting the scheduled PDSCH of the current PDCCH.

The first indicating submodule 612 is configured to indicate, with DCI of the current PDCCH, one or more PRBs for transmitting the scheduled PDSCH in the PRB set determined by the first determining submodule 611.

According to the above example, by determining the PRB set for transmitting the scheduled PDSCH of the current PDCCH, and indicating with the DCI of the current PDCCH one or more PRBs for transmitting the scheduled PDSCH in the PRB set determined by the first determining submodule 611, it is simple to be implemented.

Figure 8:
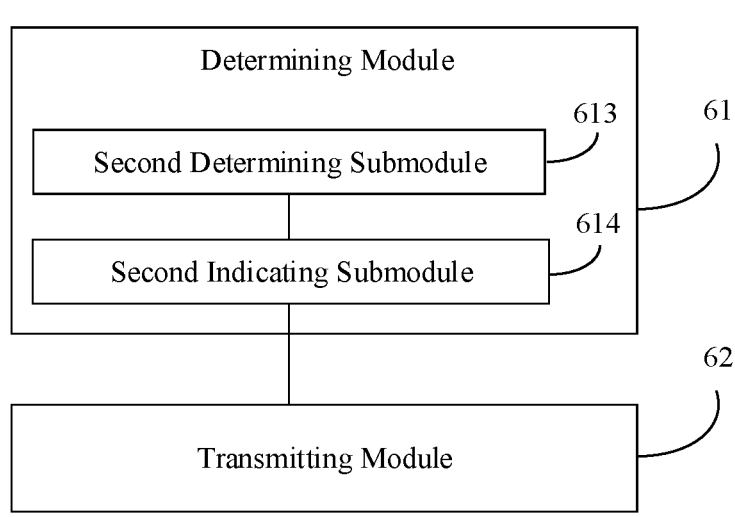
FIG. 8 is a block diagram of another apparatus for transmitting information according to an example.

FIG. 8 is a block diagram illustrating another apparatus for transmitting information according to an example. As shown in FIG. 8, on the basis of the example shown in FIG. 6, the determining module 61 may include a second determining submodule 613 and a second indicating submodule 614.

The second determining submodule 613 is configured to determine a PRB set for transmitting the PDCCH and its scheduled PDSCH, where the PDCCH occurs after the preset time period from the time point corresponding to the current PDCCH.

The second indicating submodule 614 is configured to indicate, with DCI of the current PDCCH, one or more PRBs for transmitting the PDCCH and its scheduled PDSCH in the PRB set determined by the second determining submodule 613, where the PDCCH occurs after the preset time period from the time point corresponding to the current PDCCH.

The transmitting module 62 may be configured to after an HARQ feedback for the scheduled PDSCH of the current PDCCH is received from a UE, transmit the PDCCH and its scheduled PDSCH on the one or more PRBs indicated by the second indicating submodule 614, where the PDCCH occurs after the preset time period from the time point corresponding to the current PDCCH.

According to the above example, by determining the PRB set for transmitting the PDCCH and its scheduled PDSCH and indicating with the DCI of the current PDCCH one or more PRBs for transmitting the PDCCH and its scheduled PDSCH in the PRB set determined by the second determining submodule 613, where the PDCCH occurs after the preset time period from the time point corresponding to the current PDCCH, it is simple to be implemented. Further, after the HARQ feedback for the scheduled PDSCH of the current PDCCH is received from the UE, the PDCCH that occurs after the preset time period from the time point corresponding to the current PDCCH and its scheduled PDSCH are transmitted on the one or more PRBs indicated by the second indicating submodule 614, so that it is realized to transmit the channels on a plurality of PRBs.

Figure 9:
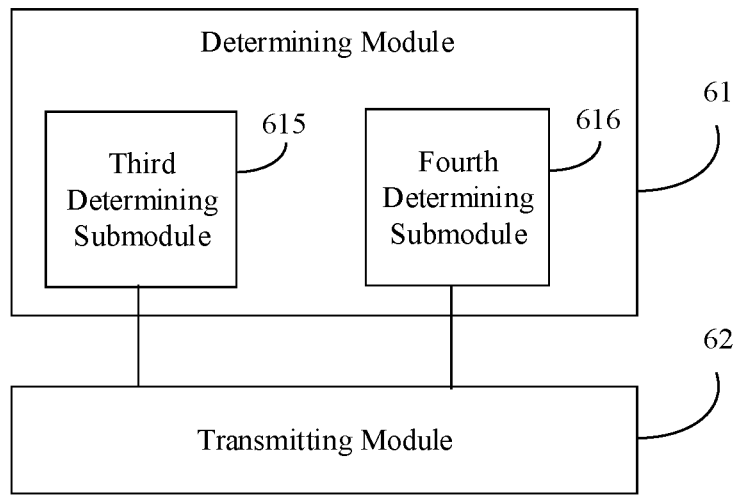
FIG. 9 is a block diagram of another apparatus for transmitting information according to an example.

FIG. 9 is a block diagram illustrating another apparatus for transmitting information according to an example. As shown in FIG. 9, on the basis of the example shown in FIG. 6, the determining module 61 may include a third determining submodule 615 or a fourth determining submodule 616.

The third determining submodule 615 is configured to determine one or more PRBs for repeatedly transmitting the PDCCH that occurs after the preset time period from the time point corresponding to the current PDCCH.

The fourth determining submodule 616 is configured to determine one or more PRBs for repeatedly transmitting the PDCCH and its scheduled PCSCH, where the PDCCH occurs after the preset time period from the time point corresponding to the current PDCCH.

In the above example, determining one or more PRBs for repeatedly transmitting the one or more associated channels of the current PDCCH may include determining one or more PRBs for repeatedly transmitting the PDCCH that occurs after the preset time period from the time point corresponding to the current PDCCH, or determining one or more PRBs for repeatedly transmitting the PDCCH that occurs after the preset time period from the time point corresponding to the current PDCCH and its scheduled PCSCH, which can work in many application scenario.

Figure 10:
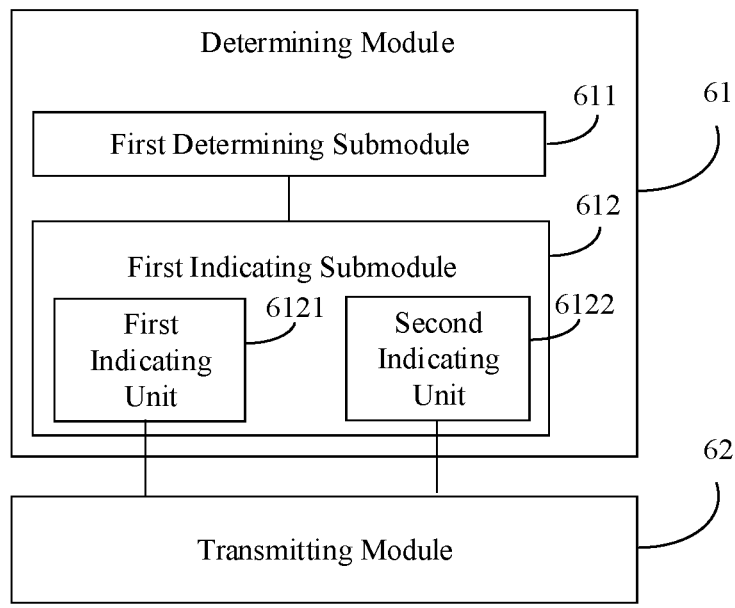
FIG. 10 is a block diagram of another apparatus for transmitting information according to an example.

FIG. 10 is a block diagram illustrating another apparatus for transmitting information according to an example. As shown in FIG. 10, on the basis of the example shown in FIG. 7, the first indicating submodule 612 may include a first indicating unit 6121 or a second indicating unit 6122.

The first indicating unit 6121 is configured to indicate, with an information bit-indicated status in the DCI, a PRB for transmitting the scheduled PDSCH, where different information bit-indicated statuses correspond respectively to different PRBs in the PRB set.

For example, the corresponding relationship between the information bit-indicated statuses and the PRBs which is established by the base station may be as shown in Table 1.

The second indicating unit 6122 is configured to indicate, with an RNTI value with which CRC of the DCI is scrambled, a PRB for transmitting the scheduled PDSCH, where different RNTI values correspond respectively to different PRBs in the PRB set.

For example, the corresponding relationship between the RNTI values and the PRBs which is established by the base station may be as shown in Table 2.

According to the above example, it may indicate a PRB for transmitting the scheduled PDSCH with an information bit-indicated status in the DCI or with an RNTI value with which the CRC of the DCI is scrambled, with flexible means of implementation.

Figure 11:
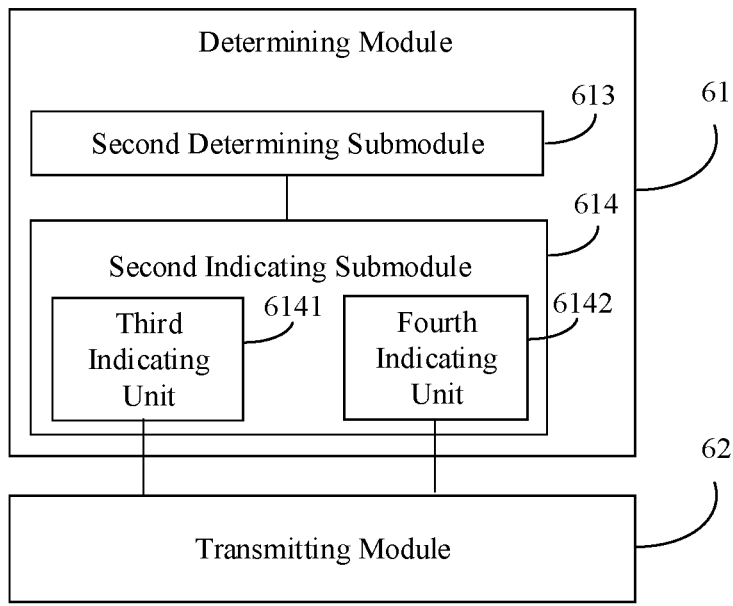
FIG. 11 is a block diagram of another apparatus for transmitting information according to an example.

FIG. 11 is a block diagram illustrating another apparatus for transmitting information according to an example. As shown in FIG. 11, on the basis of the example shown in FIG. 8, the second indicating submodule 614 may include a third indicating unit 6141 or a fourth indicating unit 6142.

The third indicating unit 6141 is configured to indicate, with an information bit-indicated status in the DCI, a PRB for transmitting the PDCCH and its scheduled PDSCH, where the PDCCH occurs after the preset time period from the time point corresponding to the current PDCCH, and where different information bit-indicated statuses correspond respectively to different PRBs in the PRB set.

The fourth indicating unit 6142 is configured to indicate, with an RNTI value with which CRC of the DCI is scrambled, a PRB for transmitting the PDCCH and its scheduled PDSCH, where the PDCCH occurs after the preset time period from the time point corresponding to the current PDCCH, and where different RNTI values correspond respectively to different PRBs in the PRB set.

According to the above example, it may indicate, with an information bit-indicated status in the DCI or with an RNTI value with which CRC of the DCI is scrambled, a PRB for transmitting the PDCCH that occurs after the preset time period from the time point corresponding to the current PDCCH and its scheduled PDSCH, with flexible means of implementation.

Figure 12:
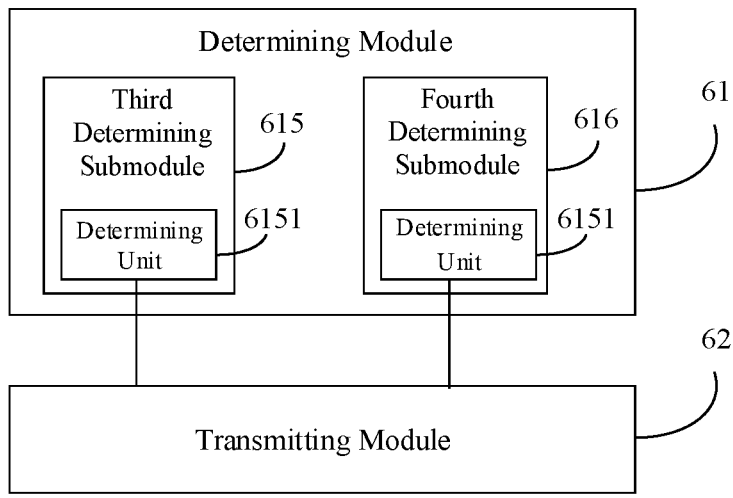
FIG. 12 is a block diagram of another apparatus for transmitting information according to an example.

FIG. 12 is a block diagram illustrating another apparatus for transmitting information according to an example. As shown in FIG. 12, on the basis of the example shown in FIG. 9, the third determining submodule 615 or the fourth determining submodule 615 may include a determining unit 6151.

The determining unit 6151 is configured to determine one or more PRBs for repeatedly transmitting the one or more associated channels based on generated first configuration information. The first configuration information includes either a distance between each PRB to be determined and the current PRB or an index of each PRB to be determined, and includes a number of times each associated channel is repeatedly transmitted on each PRB. The one or more associated channels include the PDCCH and its scheduled PDSCH, or include the PDCCH, where the PDCCH occurs after the preset time period from the time point corresponding to the current PDCCH.

According to the above example, by determining one or more PRBs for repeatedly transmitting the one or more associated channels based on the generated first configuration information, it is simple to be implemented.

Figure 13:
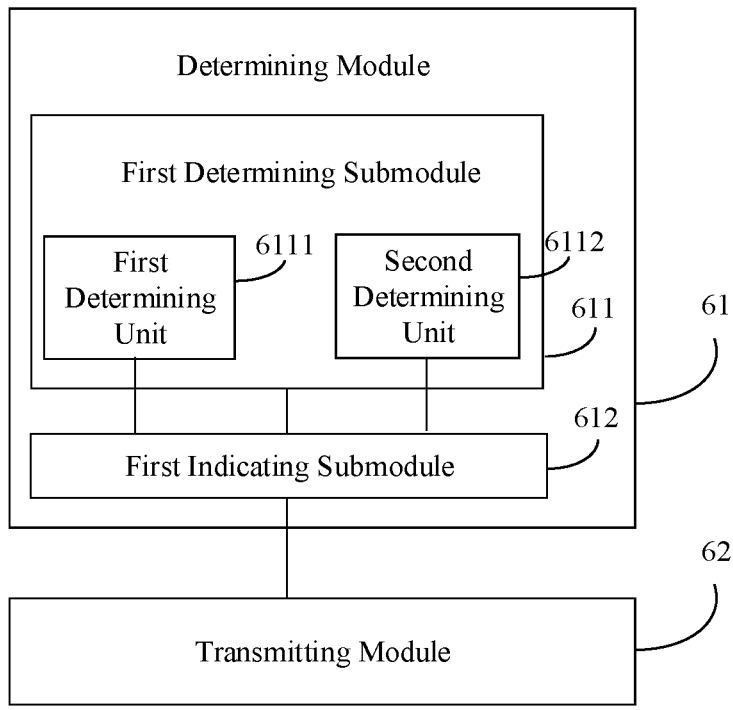
FIG. 13 is a block diagram of another apparatus for transmitting information according to an example.

FIG. 13 is a block diagram illustrating another apparatus for transmitting information according to an example. As shown in FIG. 13, on the basis of the example shown in FIG. 7, the first determining submodule 611 may include a first determining unit 6111 or a second determining unit 6112.

The first determining unit 6111 is configured to determine the PRB set based on generated second configuration information.

The second determining unit 6112 is configured to determine the PRB set based on a preset rule.

According to the above example, by determining the PRB set based on the generated second configuration information or the preset rule, its means of implementation are flexible.

Figure 14:
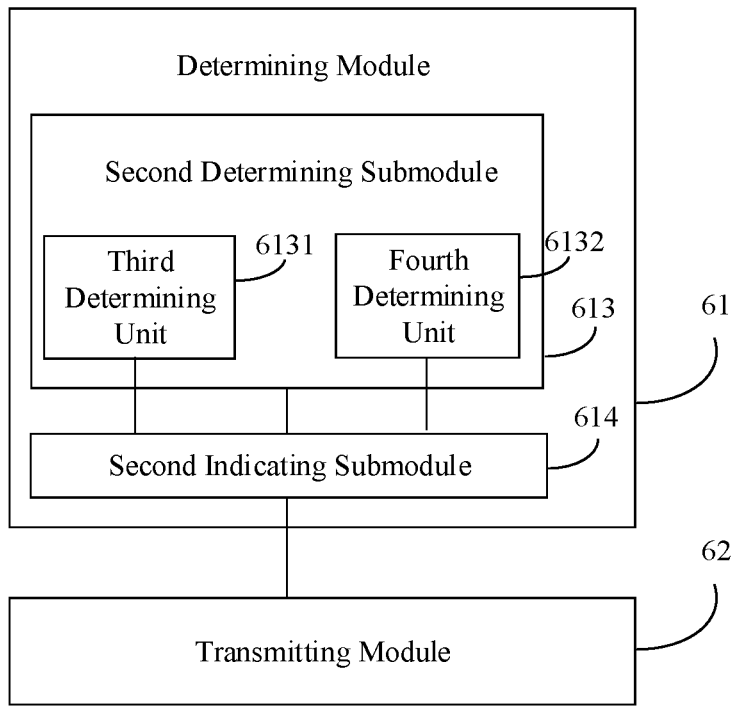
FIG. 14 is a block diagram of another apparatus for transmitting information according to an example.

FIG. 14 is a block diagram illustrating another apparatus for transmitting information according to an example. As shown in FIG. 14, on the basis of the example shown in FIG. 8, the second determining submodule 613 may include a third determining unit 6131 or a fourth determining unit 6132.

The third determining unit 6131 is configured to determine the PRB set based on generated third configuration information.

The fourth determining unit 6132 is configured to determine the PRB set based on a preset rule.

According to the above example, by determining the PRB set based on the generated third configuration information or the preset rule, its means of implementation are flexible.

Figure 15:
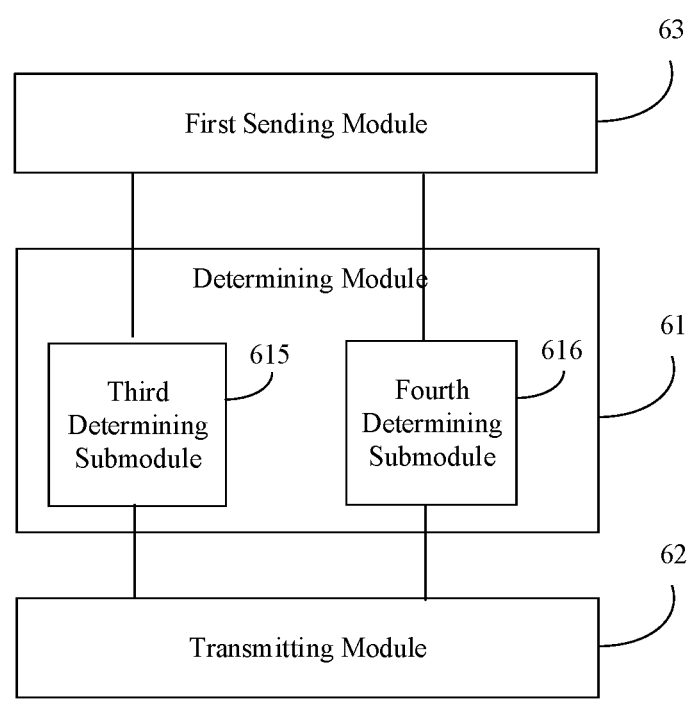
FIG. 15 is a block diagram of another apparatus for transmitting information according to an example.

FIG. 15 is a block diagram illustrating another apparatus for transmitting information according to an example. As shown in FIG. 15, on the basis of the example shown in FIG. 12, the apparatus may further include a first sending module 63.

The first sending module 63 is configured to send the first configuration information to the UE through the scheduled PDSCH of the current PDCCH, to enable the UE to determine at least two PRBs for repeatedly transmitting the one or more associated channels and obtain the number of times each associated channel is repeatedly transmitted on each PRB.

According to the above example, by sending the first configuration information to the UE through the scheduled PDSCH of the current PDCCH, to enable the UE to determine the at least two PRBs for repeatedly transmitting the one or more associated channels and obtain the number of times each associated channel is repeatedly transmitted on each PRB, it is possible to subsequently receive the one or more channels on different PRBs.

Figure 16:
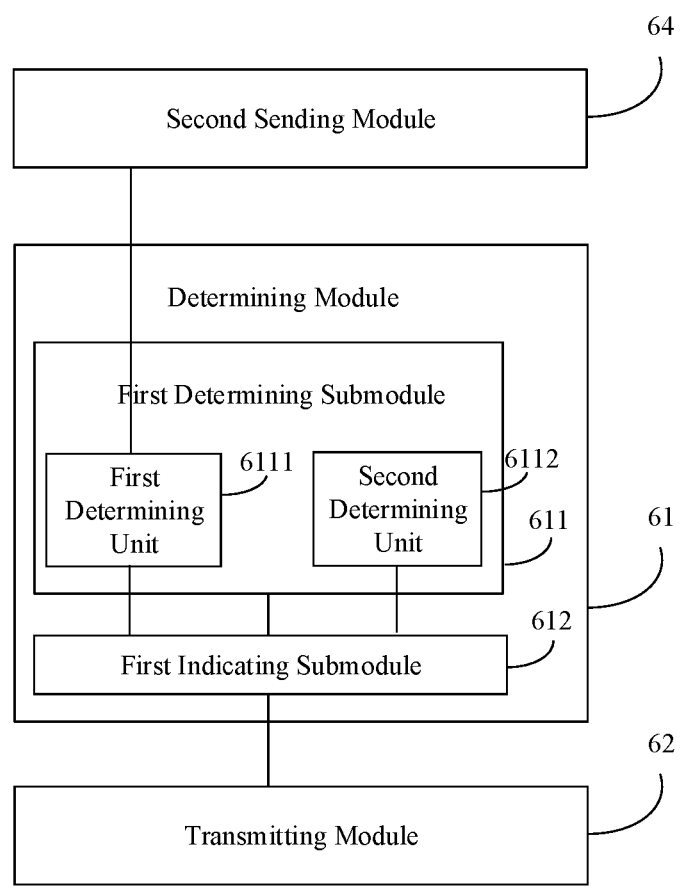
FIG. 16 is a block diagram of another apparatus for transmitting information according to an example.

FIG. 16 is a block diagram illustrating another apparatus for transmitting information according to an example. As shown in FIG. 16, on the basis of the example shown in FIG. 13, the apparatus may further include a second sending module 64.

The second sending module 64 is configured to after the PRB set is determined by the first determining unit 6111 based on the generated second configuration information, send the second configuration information to the UE through a high-layer signaling.

According to the above example, by sending the second configuration information to the UE through the high-layer signaling, to enable the UE to determine the PRB set for transmitting the one or more associated channels, it is possible to subsequently receive the one or more channels on different PRBs.

Figure 17:
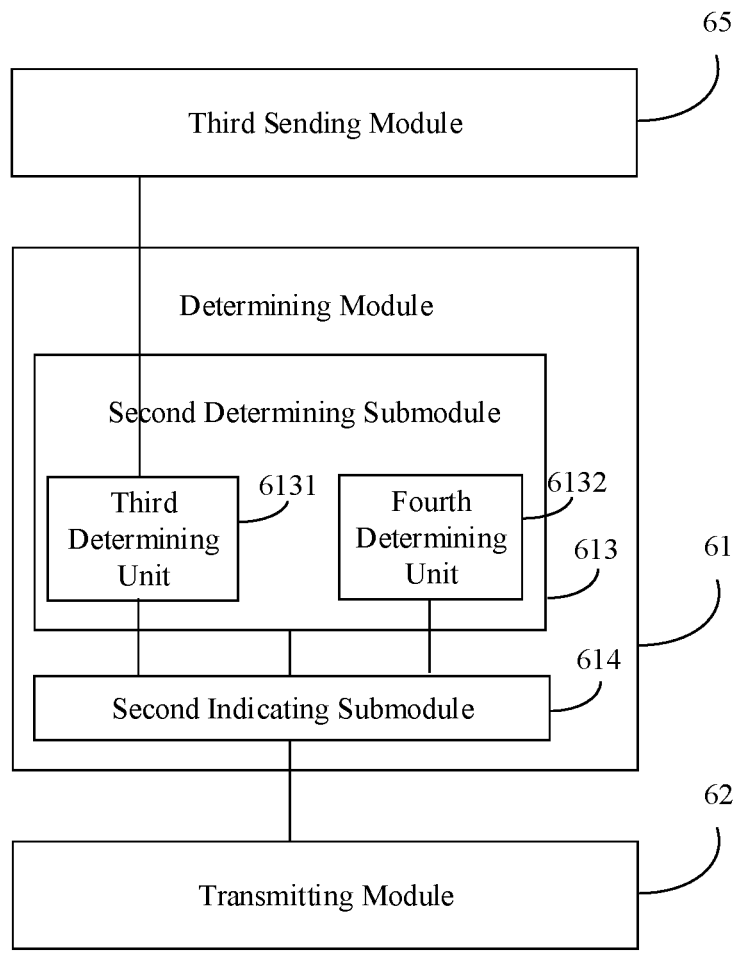
FIG. 17 is a block diagram of another apparatus for transmitting information according to an example.

FIG. 17 is a block diagram illustrating another apparatus for transmitting information according to an example. As shown in FIG. 17, on the basis of the example shown in FIG. 14, the apparatus may further include a third sending module 65.

The third sending module 65 is configured to after the PRB set is determined by the third determining unit 6131 based on the generated third configuration information, send the third configuration information to the UE through a high-layer signaling.

According to the above example, by sending the third configuration information to the UE through the high-layer signaling, to enable the UE to determine the PRB set for transmitting the one or more associated channels, it is possible to subsequently receive the one or more channels on different PRBs.

Figure 18:
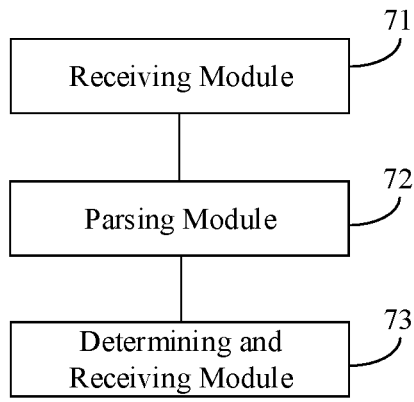
FIG. 18 is a block diagram of an apparatus for receiving information according to an example.

FIG. 18 is a block diagram illustrating an apparatus for receiving information according to an example. The apparatus may be located in a UE. As shown in FIG. 18, the apparatus includes a receiving module 71, a parsing module 72, and a determining and receiving module 73.

The receiving module 71 is configured to receive a current PDCCH on a current PRB.

The parsing module 72 is configured to parse DCI of the current PDCCH received by the receiving module 71.

The determining and receiving module 73 is configured to receive one or more associated channels of the current PDCCH correspondingly on one or more other PRBs if it determines, based on a parsing result from the parsing module 72, that the one or more associated channels are transmitted by a base station on the one or more other PRBs.

In one or more embodiments, the one or more associated channels of the current PDCCH may include but are not limited to a scheduled PDSCH of the current PDCCH, may include a PDCCH that occurs after a preset time period from a time point corresponding to the current PDCCH and its scheduled PDSCH, and may include the PDCCH that occurs after the preset time period from the time point corresponding to the current PDCCH.

In this example, if it is determined based on the parsing result that the one or more associated channels of the current PDCCH are transmitted by the base station on the one or more other PRBs, the one or more associated channels may be received correspondingly on the one or more other PRBs.

According to the above example, by receiving the current PDCCH on the current PRB, parsing the DCI of the current PDCCH, and when determining based on the parsing result that the one or more associated channels of the current PDCCH are transmitted by the base station on the one or more other PRBs, receiving the one or more associated channels correspondingly on the one or more other PRBs, it can avoid service congestion caused by excessive load on a certain PRB.

Figure 19:
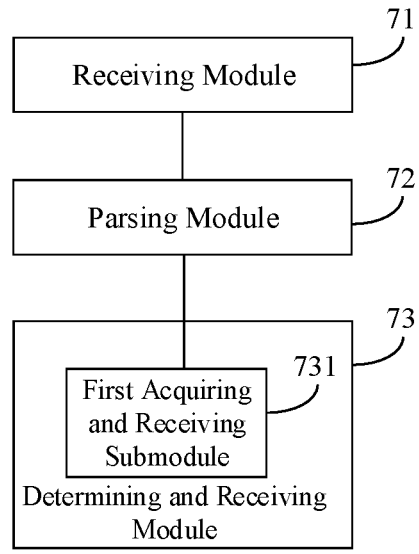
FIG. 19 is a block diagram of another apparatus for receiving information according to an example.

FIG. 19 is a block diagram illustrating another apparatus for receiving information according to an example. As shown in FIG. 19, on the basis of the example shown in FIG. 18, the determining and receiving module 73 may include a first acquiring and receiving submodule 731.

The first acquiring and receiving submodule 731 is configured to receive the scheduled PDSCH of the current PDCCH on the one or more other PRBs when it acquires, based on the parsing result, that the one or more other PRBs are for transmitting the scheduled PDSCH of the current PDCCH.

In one embodiment, for example, if PDCCH1 is the current PDCCH and PRB1 is the current PRB, the UE may receive the PDCCH1 on the PRB1 and parse PDCCH1 to obtain the parsing result. The parsing result may include one or more information bit-indicated statuses of the DCI or one or more RNTI values with which the CRC of the DCI is scrambled.

In this embodiment, the UE may determine the PRB set for transmitting the scheduled PDSCH1 of the PDCCH1 based on the received second configuration information or the preset rule, and acquire, based on the determined PRB set and the above parsing result, that one or more PRBs, e.g., PRB2, are for transmitting the scheduled PDSCH1 of the PDCCH1. Then, the UE receives the PDSCH1 on the PRB2.

According to the above example, when it is acquired based on the parsing result that the one or more other PRBs are for transmitting the scheduled PDSCH of the current PDCCH, the scheduled PDSCH of the current PDCCH can be received on the one or more other PRBs. That is, the UE can transmit the one or more channels on different PRBs, thereby avoiding service congestion caused by excessive load on a certain PRB.

Figure 20:
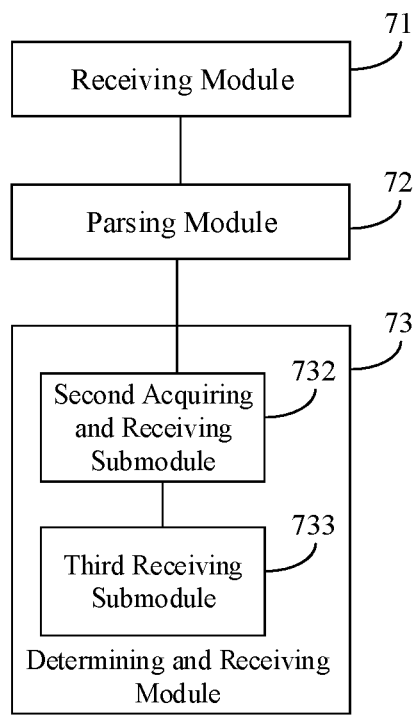
FIG. 20 is a block diagram of another apparatus for receiving information according to an example.

FIG. 20 is a block diagram illustrating another apparatus for receiving information according to an example. As shown in FIG. 20, on the basis of the example shown in FIG. 18, the determining and receiving module 73 may include a second acquiring and receiving submodule 732 and a third receiving submodule 733.

The second acquiring and receiving submodule 732 is configured to receive the scheduled PDSCH of the current PDCCH on the current PRB when it acquires, based on the parsing result, that the current PRB is for transmitting the scheduled PDSCH of the current PDCCH and the one or more other PRBs are for transmitting the PDCCH and its scheduled PDSCH, where the PDCCH occurs after the preset time period from the time point corresponding to the current PDCCH.

The third receiving submodule 733 is configured to receive the PDCCH and its scheduled PDSCH on the one or more other PRBs after an HARQ feedback is provided for the scheduled PDSCH received by the second acquiring and receiving submodule 732, where the PDCCH occurs after the preset time period from the time point corresponding to the current PDCCH.

In one or more embodiments, the UE may determine the PRB set for transmitting the PDCCH and its scheduled PDSCH based on the received third configuration information or the preset rule, and may acquire, based on the determined PRB set and the parsing result, that one or more other PRBs are for transmitting the PDCCH and its scheduled PDSCH, where the PDCCH occurs after the preset time period from the time point corresponding to the current PDCCH. The parsing result may include one or more information bit-indicated statuses of the DCI or one or more RNTI values with which CRC of the DCI is scrambled.

Supposing that PDCCH1 is the current PDCCH, PDCCH2 is the PDCCH that occurs after the preset time period from the time point corresponding to the current PDCCH, (PRB1, PRB2, PRB3, PRB4) is the PRB set determined by the base station and for transmitting the PDCCH that occurs after the preset time period from the time point corresponding to the current PDCCH and its scheduled PDSCH, and it is indicated with the DCI of the PDCCH1 that the PRB2 in the PRB set is for transmitting the PDCCH2 and its scheduled PDSCH2. Accordingly, after the base station transmits the PDCCH1 to the UE on the PRB1 and the UE receives the PDCCH1, the UE may acquire based on a result of parsing the PDCCH1 that the PRB1 is for transmitting the scheduled PDSCH1 of the PDCCH1 and the PRB2 is for transmitting the PDCCH2 and its scheduled PDSCH2, and then receive the PDSCH1 on the PRB1.

The UE provides the HARQ feedback for the received PDSCH1, and the base station transmits the PDCCH2 and the PDSCH2 on the PRB2 after receiving the HARQ feedback.

According to the above example, the UE can receive the one or more channels on different PRBs, thereby avoiding service congestion caused by excessive load on a certain PRB.

Figure 21:
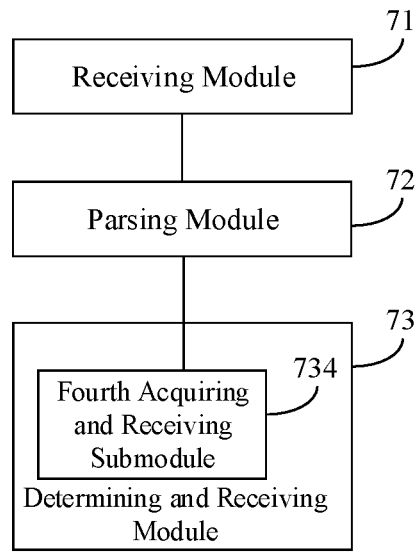
FIG. 21 is a block diagram of another apparatus for receiving information according to an example.

FIG. 21 is a block diagram illustrating another apparatus for receiving information according to an example. As shown in FIG. 21, on the basis of the example shown in FIG. 18, the determining and receiving module 73 may include a fourth acquiring and receiving submodule 734.

The fourth acquiring and receiving submodule 734 is configured to receive, in accordance with an obtained number of times each associated channel is repeatedly transmitted on each PRB, one or more repetitions of the PDCCH on each of acquired PRBs if it acquires, based on the parsing result, that at least two PRBs are for repeatedly transmitting the PDCCH, where the PDCCH occurs after the preset time period from the time point corresponding to the current PDCCH.

In one or more embodiments, if the UE acquires that the at least two PRBs, e.g., PRB2 and PRB3, are for repeatedly transmitting the PDCCH2, and the number of times each channel is repeatedly transmitted on each PRB is 4, the UE can receive 4 repetitions of the PDCCH2 on the PRB2 and 4 repetitions of the PDCCH2 on the PRB3.

According to the above example, by receiving the repetitions of a certain channel on different PRBs, a signal-to-noise ratio can be improved, and service congestion which is caused by receiving the repetitions of the certain channel on only one PRB can also be avoided.

Figure 22:
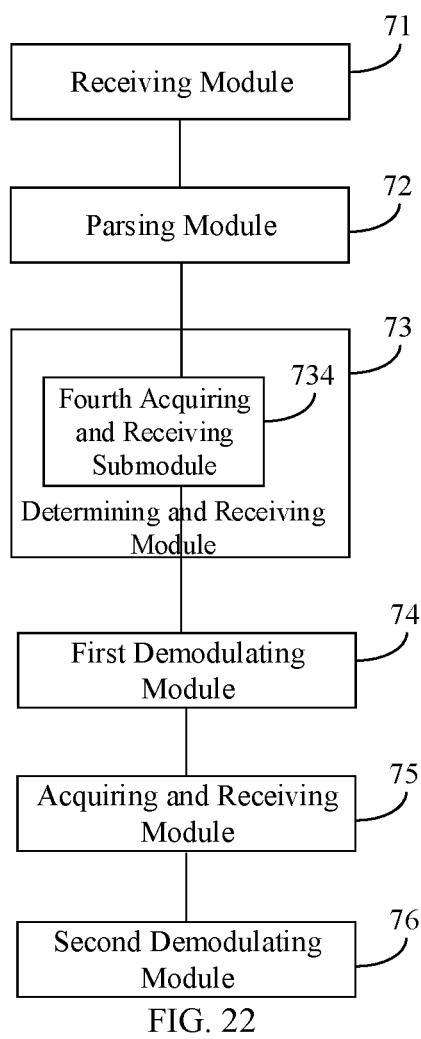
FIG. 22 is a block diagram of another apparatus for receiving information according to an example.

FIG. 22 is a block diagram illustrating another apparatus for receiving information according to an example. As shown in FIG. 22, on the basis of the above example shown in FIG. 21, the apparatus may further include a first demodulating module 74, an acquiring and receiving module 75, and a second demodulating module 76.

The first demodulating module 74 is configured to combine and demodulate all information of the PDCCH received by the fourth acquiring and receiving submodule 734.

The acquiring and receiving module 75 is configured to receive, in accordance with the obtained number of times each associated channel is repeatedly transmitted on each PRB, one or more repetitions of the scheduled PDSCH of the PDCCH on each of currently acquired PRBs if it acquires, based on the parsing result from the first demodulating module 74, that at least two PRBs are for repeatedly transmitting the scheduled PDSCH, where the PDCCH occurs after the preset time period from the time point corresponding to the current PDCCH.

In one or more embodiments, if the UE acquires, based on the demodulating result, that the at least two PRBs, e.g., still PRB2 and PRB3, are for repeatedly transmitting the scheduled PDSCH2 of the PDCCH2, and the number of times each channel is repeatedly transmitted on each PRB is 4, the UE can receive 4 repetitions of the PDSCH2 on the PRB2 and 4 repetitions of the PDSCH2 on the PRB3.

The second demodulating module 76 is configured to combine and demodulate all information of the PDSCH received by the acquiring and receiving module 75.

The UE may combine and demodulate all the received information of the PDSCH to obtain information on one transport block.

According to the above example, the UE can repeatedly receive a certain channel on different PRBs, thereby avoiding service congestion caused by excessive load on a certain PRB.

Figure 23:
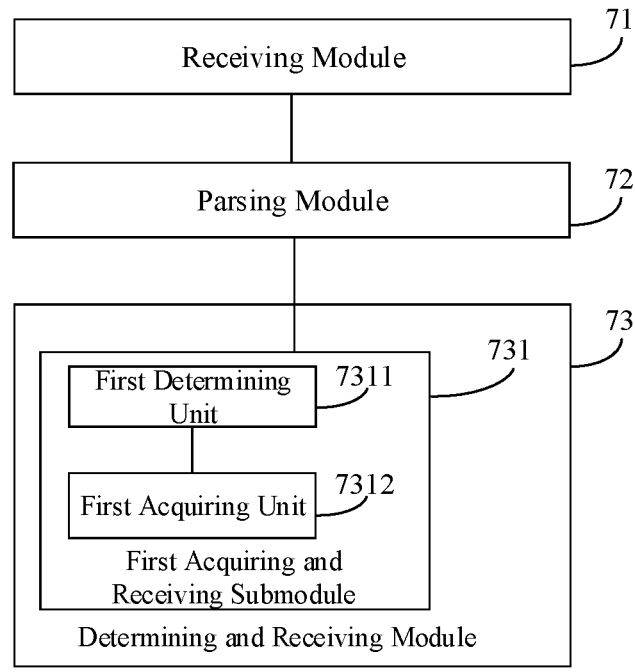
FIG. 23 is a block diagram of another apparatus for receiving information according to an example.

FIG. 23 is a block diagram illustrating another apparatus for receiving information according to an example. As shown in FIG. 23, on the basis of the example shown in FIG. 19, the first acquiring and receiving submodule 731 may include a first determining unit 7311 and a first acquiring unit 7312.

The first determining unit 7311 is configured to determine, based on received second configuration information or a preset rule, a PRB set for transmitting the scheduled PDSCH of the current PDCCH.

The first acquiring unit 7312 is configured to acquire, based on the parsing result and the PRB set determined by the first determining unit 7311, that the one or more other PRBs are for transmitting the scheduled PDSCH of the current PDCCH. The parsing result includes one or more information bit-indicated statuses of the DCI or one or more RNTI values with which CRC of the DCI is scrambled.

According to the above example, by determining the PRB set for transmitting the scheduled PDSCH of the current PDCCH based on the received second configuration information or the preset rule, and acquiring, based on the PRB set determined by the first determining unit 7311, and the parsing result that the one or more other PRBs are for transmitting the scheduled PDSCH of the current PDCCH, it is simple to be implemented.

Figure 24:
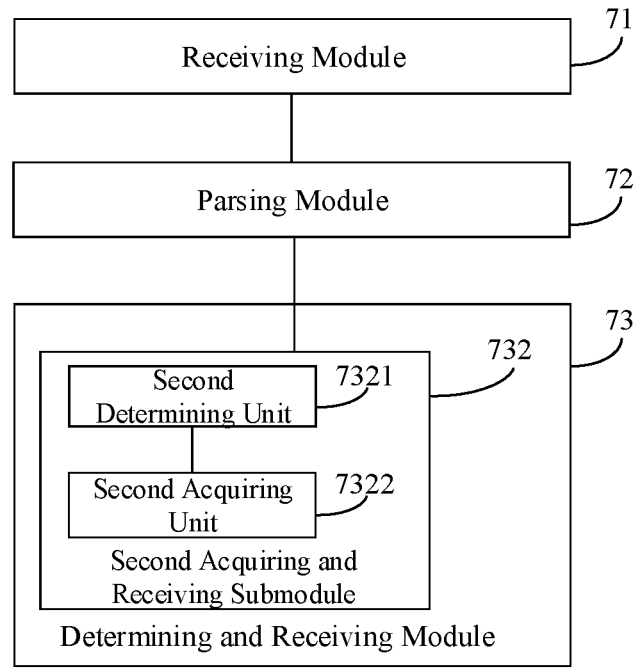
FIG. 24 is a block diagram of another apparatus for receiving information according to an example.

FIG. 24 is a block diagram illustrating another apparatus for receiving information according to an example. As shown in FIG. 24, on the basis of the example shown in FIG. 20, the second acquiring and receiving submodule 732 may include a second determining unit 7321 and a second acquiring unit 7322.

The second determining unit 7321 is configured to determine, based on received third configuration information or a preset rule, a PRB set for transmitting the PDCCH and its scheduled PDSCH, where the PDCCH occurs after the preset time period from the time point corresponding to the current PDCCH.

The second acquiring unit 7322 is configured to acquire, based on the parsing result and the PRB set determined by the second determining unit 7321, that the one or more other PRBs are for transmitting the PDCCH and its scheduled PDSCH, where the PDCCH occurs after the preset time period from the time point corresponding to the current PDCCH. The parsing result includes one or more information bit-indicated statuses of the DCI or one or more RNTI values with which CRC of the DCI is scrambled.

According to the above example, by determining the PRB set for transmitting the PDCCH and its scheduled PDSCH based on the received third configuration information or the preset rule, and acquiring, based on the PRB set determined by the second determining unit 7321 and the parsing result, that the one or more other PRBs are for transmitting the PDCCH that occurs after the preset time period from the time point corresponding to the current PDCCH and its scheduled PDSCH, it is simple to be implemented.

Figure 25:
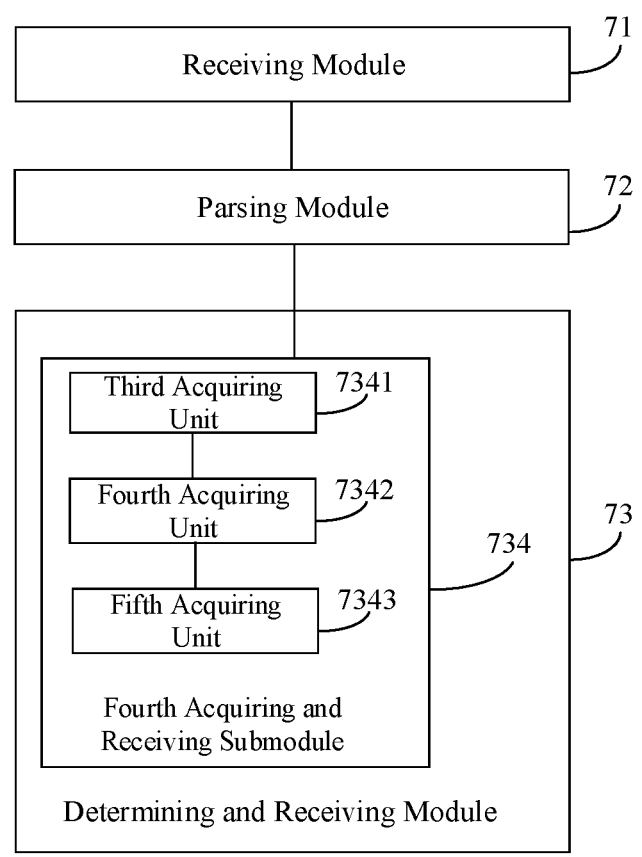
FIG. 25 is a block diagram of another apparatus for receiving information according to an example.

FIG. 25 is a block diagram illustrating another apparatus for receiving information according to an example. As shown in FIG. 25, on the basis of the example shown in FIG. 21, the fourth acquiring and receiving submodule 734 may include a third acquiring unit 7341, a fourth acquiring unit 7342, and a fifth acquiring unit 7343.

The third acquiring unit 7341 is configured to acquire the scheduled PDSCH of the current PDCCH based on the parsing result.

The fourth acquiring unit 7342 is configured to acquire first configuration information from the scheduled PDSCH acquired by the third acquiring unit 7341.

The fifth acquiring unit 7343 is configured to acquire, based on the first configuration information acquired by the fourth acquiring unit 7342, that the at least two PRBs are for transmitting the PDCCH, where the PDCCH occurs after the preset time period from the time point corresponding to the current PDCCH.

According to the above example, by determining the scheduled PDSCH of the current PDCCH based on the parsing result, obtaining the first configuration information from the acquired scheduled PDSCH, and acquiring, based on the obtained first configuration information, that the at least two PRBs are for transmitting the PDCCH that occurs after the preset time period from the time point corresponding to the current PDCCH, it is simple to be implemented.

Figure 26:
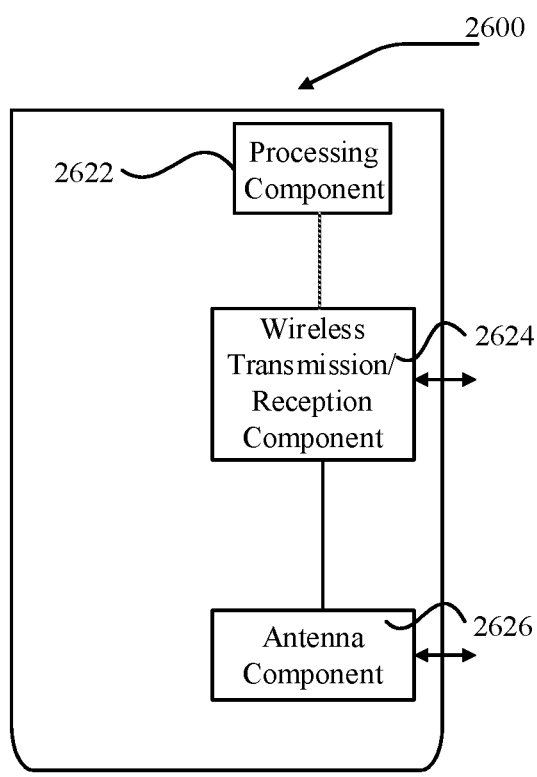
FIG. 26 is a block diagram illustrating a device applicable to transmitting information according to an example.

FIG. 26 is a block diagram illustrating a device applicable to transmitting information according to an example. The device 2600 may be provided as a base station. As shown in FIG. 26, the device 2600 includes a processing component 2622, a wireless transmission/reception component 2624, an antenna component 2626, and a signal processing part peculiar to the wireless interface. The processing component 2622 may further include one or more processors.

One of the processors of the processing component 2622 may be configured to:

determine one or more PRBs for transmitting one or more associated channels of a current PDCCH, where the one or more determined PRBs include one or more PRBs other than a current PRB for transmitting the current PDCCH;

transmitting the one or more associated channels on the one or more determined PRBs.

In an example, a non-transitory computer-readable storage medium including instructions is provided, and the instructions may be executed by the processing component 2622 of the device 2600 to complete the above methods of transmitting information. For example, the non-transitory computer-readable storage medium may be a Read-Only Memory (ROM), a Random-Access Memory (RAM), CD-ROM, a magnetic tape, a floppy disk, an optical data storage device, and the like.

Figure 27:
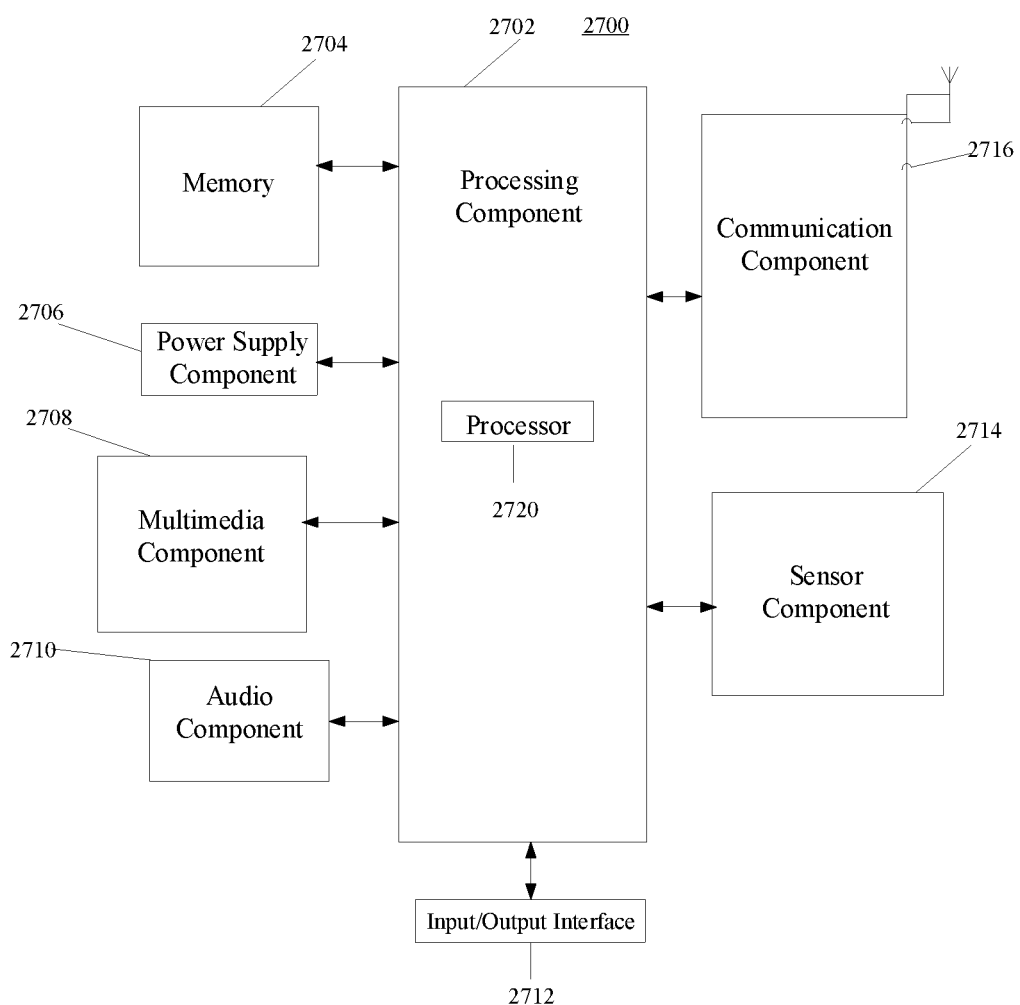
FIG. 27 is a block diagram illustrating a device applicable to receiving information according to an example.

FIG. 27 is a block diagram illustrating a device applicable to receiving information according to an example. For example, the device 2700 may be a mobile phone, a computer, a digital broadcast terminal, a message receiving and transmitting device, a game console, a tablet device, a medical device, a fitness device, a personal digital assistant, and other user equipment.

As shown in FIG. 27, the device 2700 may include one or more of the following components: a processing component 2702, a memory 2704, a power supply component 2706, a multimedia component 2708, an audio component 2710, an input/output (I/O) interface 2727, a sensor component 2714, and a communication component 2716.

The processing component 2702 generally controls overall operations of the device 2700, such as operations associated with display, phone calls, data communications, camera operations, and recording operations. The processing component 2702 may include one or more processors 2720 to execute instructions to complete all or part of the steps of the above methods. In addition, the processing component 2702 may include one or more modules which facilitate the interaction between the processing component 2702 and other components. For example, the processing component 2702 may include a multimedia module to facilitate the interaction between the multimedia component 2708 and the processing component 2702.

One of the processors 2720 of the processing component 2702 may be configured to:

receive a current PDCCH on a current PRB;
parse DCI of the current PDCCH; and in response to determining, based on a parsing result, that one or more associated channels of the current PDCCH are transmitted by a base station on one or more other PRBs, receive the one or more associated channels correspondingly on the one or more other PRBs.

The memory 2704 is configured to store various types of data to support the operation of the device 2700. Embodiments of such data include instructions for any application or method operating on the device 2700, contact data, phone book data, messages, pictures, videos, and the like. The memory 2704 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 2706 supplies power for different components of the device 2700. The power supply component 2706 may include a power supply management system, one or more power supplies, and other components associated with generating, managing and distributing power for the device 2700.

The multimedia component 2708 includes a screen providing an output interface between the device 2700 and a user. In some embodiments, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a duration and a pressure associated with the touch or swipe. In some embodiments, the multimedia component 2708 may include a front camera and/or a rear camera. The front camera and/or rear camera may receive external multimedia data when the device 2700 is in an operating mode, such as a photographing mode or a video mode. Each front camera and rear camera may be a fixed optical lens system or have focal length and optical zooming capability.

The audio component 2710 is configured to output and/or input an audio signal. For example, the audio component 2710 includes a microphone (MIC). When the device 2700 is in an operating mode, such as a call mode, a record mode and a voice recognition mode, the microphone is configured to receive an external audio signal. The received audio signal may be further stored in the memory 2704 or sent via the communication component 2716. In some embodiments, the audio component 2710 further includes a speaker for outputting an audio signal.

The I/O interface 2727 provides an interface between the processing component 2702 and a peripheral interface module. The above peripheral interface module may be a keyboard, a click wheel, buttons, or the like. These buttons may include but not limited to, a home button, a volume button, a start button and a lock button.

The sensor component 2714 includes one or more sensors to provide status assessments of various aspects for the device 2700. For example, the sensor component 2714 may detect the on/off status of the device 2700, and relative positioning of components, such as a display and a keypad of the device 2700. The sensor component 2714 may also detect a change in position of the device 2700 or a component of the device 2700, the presence or absence of user contact with the device 2700, orientation or acceleration/deceleration of the device 2700, and temperature change of the device 2700. The sensor component 2714 may include a proximity sensor configured to detect the presence of a nearby object without any physical contact. The sensor component 2714 may also include a light sensor, such as a Complementary Metal-Oxide-Semiconductor (CMOS) or Charged Coupled Device (CCD) image sensor, for use in imaging applications. In some embodiments, the sensor component 2714 may further include an acceleration sensor, a gyroscope sensor, a magnetic sensor, a pressure sensor, or a temperature sensor.

The communication component 2716 is configured to facilitate wired or wireless communication between the device 2700 and other devices. The device 2700 may access a wireless network based on a communication standard, such as Wi-Fi, 2G or 3G, or a combination thereof. In an embodiment, the communication component 2716 receives a broadcast signal or broadcast-associated information from an external broadcast management system via a broadcast channel. In an embodiment, the communication component 2716 may further include a Near Field Communication (NFC) module for facilitate short-range communication. For example, the NFC module may be implemented based on a radio frequency identification (RFID) technology, an infrared data association (IrDA) technology, an ultra-wideband (UWB) technology, a Bluetooth® (BT) technology and other technologies.

In one or more embodiment, the device 2700 may be implemented by one or more Application Specific Integrated Circuits (ASICs), Digital Signal Processors (DSPs), Digital Signal Processing Devices (DSPDs), programmable Logic Devices (PLDs), Field Programmable Gate Arrays (FPGAs), controllers, microcontrollers, microprocessors, or other electronic components for performing the above methods.

In one or more embodiments, there is also provided a non-transitory computer-readable storage medium including instructions, such as the memory 2704 including instructions executable by the processor 2720 of the device 2700 to implement the above methods. For example, the non-transitory computer-readable storage medium may be a Read-Only Memory (ROM), a Random-Access Memory (RAM), CD-ROM, a magnetic tape, a floppy disk, an optical data storage device, and the like.

Since the apparatus examples essentially correspond to the method examples, reference may be made to the description of related parts of the method examples. The apparatus embodiments described above are merely illustrative, wherein the units described as separate components may or may not be physically separated, and the components displayed as units may or may not be physical units, that is, may be located in one place or distributed to multiple units in a network. Some or all of the modules may be selected according to actual needs to achieve the objectives of the implementations of the examples. It can be understood and implemented by those of ordinary skill in the art without any creative effort.

It should be noted that the relational terms such as "first" and "second" used herein are merely intended to distinguish one entity or operation from another entity or operation rather than to require or imply any such actual relationship or order existing between these entities or operations. Also, the term "including", "containing", or any variation thereof is intended to encompass non-exclusive inclusion, so that a process, method, article, or device including a series of elements includes not only those elements but also other elements not listed explicitly or those elements inherent to such a process, method, article, or device. Without more limitations, an element defined by the statement "including a . . . " shall not be precluded to include additional same elements present in a process, method, article or device.

Other implementations of the present disclosure will be readily apparent to those skilled in the art after implementing the disclosure by referring to the specification. The present disclosure is intended to cover any variations, uses, or adaptations of the present disclosure that are in accordance with the general principles thereof and include common general knowledge or conventional technical means in the art that are not disclosed in the present disclosure. The specification and examples therein are only illustrative, and the scope and spirit of the present disclosure are to be indicated by appended claims.

It should be understood that the present disclosure is not limited to the above described accurate structures shown in the drawings, and various modifications and changes can be made to the present disclosure without departing from the scope thereof. The scope of the present disclosure is to be limited only by the appended claims.

What is claimed is:

1. A method of transmitting information, being applicable to a base station, comprising:
   determining a physical resource block (PRB) set for transmitting a second physical downlink control channel (PDCCH) that occurs after a preset time period from a time point corresponding to a current PDCCH and its scheduled physical downlink shared channel (PDSCH);
   indicating, with downlink control information (DCI) of the current PDCCH, one or more PRBs for transmitting the second PDCCH and its scheduled PDSCH in the PRB set; wherein the one or more indicated PRBs comprise one or more PRBs other than a current PRB for transmitting the current PDCCH; and
   in response to receiving a hybrid automatic repeat request (HARQ) feedback for the scheduled PDSCH of the current PDCCH from a user equipment (UE), transmitting the second PDCCH and its scheduled PDSCH on the one or more indicated PRBs.

2. The method according to claim 1, further comprising:
   determining a second PRB set for transmitting a scheduled PDSCH of the current PDCCH; and
   indicating, with the DCI of the current PDCCH, one or more second PRBs for transmitting the scheduled PDSCH in the second PRB set.

3. The method according to claim 1, further comprising:
   determining one or more third PRBs for repeatedly transmitting the second PDCCH; or
   determining one or more third PRBs and one or more fourth PRBs for repeatedly transmitting the second PDCCH and its scheduled PCSCH, respectively.

4. The method according to claim 2, wherein said indicating, with the DCI of the current PDCCH, one or more second PRBs for transmitting the scheduled PDSCH in the second PRB set comprises:
   indicating, with an information bit-indicated status in the DCI, a second PRB for transmitting the scheduled PDSCH, wherein different information bit-indicated statuses correspond respectively to different second PRBs in the second PRB set; or
   indicating, with a radio network temporary identity (RNTI) value with which cyclic redundancy check (CRC) of the DCI is scrambled, a second PRB for transmitting the scheduled PDSCH, wherein different RNTI values correspond respectively to different second PRBs in the second PRB set.

5. The method according to claim 1, wherein said indicating, with the DCI of the current PDCCH, one or more PRBs for transmitting the second PDCCH and its scheduled PDSCH in the PRB set comprises:
  indicating, with an information bit-indicated status in the DCI, a PRB for transmitting the second PDCCH and its scheduled PDSCH, wherein different information bit-indicated statuses correspond respectively to different PRBs in the PRB set; or
  indicating, with an RNTI value with which CRC of the DCI is scrambled, a PRB for transmitting the second PDCCH and its scheduled PDSCH, wherein different RNTI values correspond respectively to different PRBs in the PRB set.

6. The method according to claim 3, wherein said determining one or more third PRBs for repeatedly transmitting the second PDCCH or determining one or more third PRBs and one or more fourth PRBs for repeatedly transmitting the second PDCCH and its scheduled PCSCH, respectively, comprises:
  determining one or more third/fourth PRBs for repeatedly transmitting the one or more associated channels based on generated first configuration information;
  wherein the first configuration information comprises either a distance between each third/fourth PRB to be determined and the current PRB or an index of each third/fourth PRB to be determined, and comprises a number of times each associated channel is repeatedly transmitted on each third/fourth PRB; and
  wherein the one or more associated channels comprise the second PDCCH and its scheduled PDSCH, or comprise the second PDCCH.

7. The method according to claim 2, wherein said determining the second PRB set for transmitting the scheduled PDSCH of the current PDCCH comprises:
  determining the second PRB set based on generated second configuration information; or
  determining the second PRB set based on a preset rule;
  wherein the method further comprises:
    in response to said determining the second PRB set based on the generated second configuration information, sending the second configuration information to a UE through a high-layer signaling.

8. The method according to claim 1, wherein said determining the PRB set for transmitting the second PDCCH and its scheduled PDSCH comprises:
  determining the PRB set based on generated third configuration information; or
  determining the PRB set based on a preset rule;
  wherein the method further comprises:
    in response to said determining the PRB set based on the generated third configuration information, sending the third configuration information to the UE through a high-layer signaling.

9. The method according to claim 6, further comprising:
  sending the first configuration information to a UE through a scheduled PDSCH of the current PDCCH, to enable the UE to determine at least two third/fourth PRBs for repeatedly transmitting the one or more associated channels and obtain the number of times each associated channel is repeatedly transmitted on each third/fourth PRB.

10. A method of receiving information, being applicable to user equipment (UE), comprising:
  receiving a current physical downlink control channel (PDCCH) on a current physical resource block (PRB);
  parsing downlink control information (DCI) of the current PDCCH; and
  in response to acquiring, based on a parsing result, that the current PRB is for transmitting a scheduled physical downlink shared channel (PDSCH) of the current PDCCH and one or more PRBs other than the current PRB are for transmitting a second PDCCH that occurs after a preset time period from a time point corresponding to the current PDCCH and its scheduled PDSCH, receiving the scheduled PDSCH of the current PDCCH on the current PRB; and
  in response to providing a hybrid automatic repeat request (HARQ) feedback for the scheduled PDSCH of the current PDCCH, receiving the second PDCCH and its scheduled PDSCH on the one or more PRBs other than the current PRB.

11. The method according to claim 10, further comprising:
  in response to acquiring, based on the parsing result, that one or more second PRBs other than the current PRB are for transmitting the PDSCH of the current PDCCH, receiving the scheduled PDSCH of the current PDCCH on the one or more second PRBs other than the current PRB.

12. The method according to claim 10, further comprising:
  in response to acquiring, based on the parsing result, that at least two third PRBs are for repeatedly transmitting the second PDCCH, receiving, in accordance with an obtained number of times each associated channel is repeatedly transmitted on each third PRB, one or more repetitions of the second PDCCH on each of the acquired third PRBs.

13. The method according to claim 12, further comprising:
  combining and demodulating all received information of the second PDCCH;
  in response to acquiring, based on a demodulating result, that at least two fourth PRBs are for repeatedly transmitting a scheduled PDSCH of the second PDCCH, receiving, in accordance with the obtained number of times each associated channel is repeatedly transmitted on each fourth PRB, one or more repetitions of the scheduled PDSCH on each of the currently acquired fourth PRBs; and
  combining and demodulating all received information of the PDSCH.

14. The method according to claim 11, wherein said acquiring, based on the parsing result, that the one or more second PRBs other than the current PRB are for transmitting the scheduled PDSCH of the current PDCCH comprises:
  determining, based on received second configuration information or a preset rule, a second PRB set for transmitting the scheduled PDSCH of the current PDCCH; and
  acquiring, based on the determined second PRB set and the parsing result, that the second one or more PRBs other than the current PRB are for transmitting the scheduled PDSCH of the current PDCCH, wherein the parsing result comprises one or more information bit-indicated statuses of the DCI or one or more radio network temporary identity (RNTI) values with which cyclic redundancy check (CRC) of the DCI is scrambled.

15. The method according to claim 10, wherein said acquiring, based on the parsing result, that the current PRB is for transmitting the scheduled PDSCH of the current PDCCH and the one or more PRBs other than the current PRB are for transmitting the second PDCCH and its scheduled PDSCH comprises:

determining, based on received third configuration information or a preset rule, a PRB set for transmitting the second PDCCH and its scheduled PDSCH; and acquiring, based on the determined PRB set and the parsing result, that the one or more PRBs are for transmitting the second PDCCH and its scheduled PDSCH, wherein the parsing result comprises one or more information bit-indicated statuses of the DCI or one or more RNTI values with which CRC of the DCI is scrambled.

16. The method according to claim 12, wherein said acquiring, based on the parsing result, that the at least two third PRBs are for repeatedly transmitting the second PDCCH comprises:

acquiring a scheduled PDSCH of the current PDCCH based on the parsing result;

acquiring first configuration information from the scheduled PDSCH; and acquiring, based on the first configuration information, that the at least two third PRBs are for transmitting the second PDCCH.

17. A base station implementing the method according to claim 1, comprising:

a processor; and memory for storing instructions executable by the processor;

wherein the processor is configured to:

determine a physical resource block (PRB) set for transmitting a second physical downlink control channel (PDCCH) that occurs after a preset time period from a time point corresponding to a current PDCCH and its scheduled physical downlink shared channel (PDSCH);

indicate, with downlink control information (DCI) of the current PDCCH, one or more PRBs for transmitting the second PDCCH and its scheduled PDSCH in the PRB set; wherein the one or more indicated PRBs comprise one or more PRBs other than a current PRB for transmitting the current PDCCH; and in response to receiving a hybrid automatic repeat request (HARQ) feedback for the scheduled PDSCH of the current PDCCH from a user equipment (UE), transmit the second PDCCH and its scheduled PDSCH on the one or more indicated PRBs.

18. User equipment, comprising:

a processor; and memory for storing instructions executable by the processor;

wherein the processor is configured to:

receive a current physical downlink control channel (PDCCH) in a current physical resource block (PRB);

parse downlink control information (DCI) of the current PDCCH; and in response to acquiring, based on a parsing result, that the current PRB is for transmitting a scheduled physical downlink shared channel (PDSCH) of the current PDCCH and one or more PRBs other than the current PRB are for transmitting a second PDCCH that occurs after a preset time period from a time point corresponding to the current PDCCH and its scheduled PDSCH, receive the scheduled PDSCH of the current PDCCH on the current PRB; and in response to providing a hybrid automatic repeat request (HARQ) feedback for the scheduled PDSCH of the current PDCCH, receive the second PDCCH and its scheduled PDSCH on the one or more PRBs other than the current PRB.

\* \* \* \* \*